(12) United States Patent
Otani et al.

(10) Patent No.: US 11,401,965 B2
(45) Date of Patent: Aug. 2, 2022

(54) FASTENING STRUCTURE OF ELECTRIC MEMBER, FASTENING METHOD OF ELECTRIC MEMBER AND RELEASING METHOD OF ELECTRIC MEMBER

(71) Applicant: Honda Motor Co., Ltd., Tokyo (JP)

(72) Inventors: Takeshi Otani, Saitama (JP); Yusuke Yamamura, Saitama (JP); Hiroshi Kunii, Saitama (JP); Masashi Bando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 474 days.

(21) Appl. No.: 16/726,910

(22) Filed: Dec. 25, 2019

(65) Prior Publication Data
US 2020/0208671 A1      Jul. 2, 2020

(30) Foreign Application Priority Data

Dec. 26, 2018 (JP) .............................. JP2018-242664

(51) Int. Cl.
*F16B 25/00* (2006.01)
*H02K 11/38* (2016.01)
*H02K 5/22* (2006.01)

(52) U.S. Cl.
CPC ......... *F16B 25/0063* (2013.01); *H02K 5/225* (2013.01); *H02K 11/38* (2016.01)

(58) Field of Classification Search
CPC ...... F16B 25/0063; H02K 11/38; H02K 5/225
See application file for complete search history.

(56) References Cited

U.S. PATENT DOCUMENTS

| 6,956,169 B1 | 10/2005 | Shotey et al. |
| 2010/0054671 A1* | 3/2010 | Ban .......................... G02B 6/43 385/88 |

(Continued)

FOREIGN PATENT DOCUMENTS

| CN | 1976137 | 6/2007 |
| CN | 102770941 | 11/2012 |

(Continued)

OTHER PUBLICATIONS

"Office Action of China Counterpart Application", dated Nov. 22, 2021, with English translation thereof, pp. 1-11.

(Continued)

*Primary Examiner* — Zoheb S Imtiaz
(74) *Attorney, Agent, or Firm* — JCIPRNET

(57) ABSTRACT

A first and second electric members respectively having electrical connection portions are electrically connected in a state that mutual positions are regulated by guide pins, and fastening screws which are inserted through fastening screw insertion holes of the second electric member are screwed into screw holes for fastening of the first electric member, and thereby the first and second electric members are fastened. At least one of the screw holes for fastening has large-diameter portions into which the guide pin is detachably inserted, and small-diameter portions equipped with female screw portions. The female screw portions are not arranged in the large-diameter portions, and inner diameters of the large-diameter portions are larger than root diameters of the female screw portions, and outer circumferential surfaces of the fastening screws which are screwed with the female screw portions and inner circumferential surfaces of the large-diameter portions are not in contact with each other.

18 Claims, 25 Drawing Sheets

(56) References Cited

U.S. PATENT DOCUMENTS

| | | | |
|---|---|---|---|
| 2017/0203722 A1* | 7/2017 | Shoda | H02K 5/225 |
| 2018/0019544 A1* | 1/2018 | Ishibashi | H02K 5/22 |
| 2020/0208671 A1* | 7/2020 | Otani | F16B 35/06 |

FOREIGN PATENT DOCUMENTS

| | | |
|---|---|---|
| CN | 105041656 | 11/2015 |
| CN | 105829658 | 8/2016 |
| CN | 106463934 | 2/2017 |
| JP | H07322561 | 12/1995 |
| JP | 2009085466 | 4/2009 |
| JP | 2012038557 | 2/2012 |
| JP | 2014230303 | 12/2014 |
| JP | 2016140199 | 8/2016 |

OTHER PUBLICATIONS

Office Action of Japan Counterpart Application, with English translation thereof, dated Sep. 8, 2020, pp. 1-4.

* cited by examiner

US 11,401,965 B2

FASTENING STRUCTURE OF ELECTRIC MEMBER, FASTENING METHOD OF ELECTRIC MEMBER AND RELEASING METHOD OF ELECTRIC MEMBER

CROSS-REFERENCE TO RELATED APPLICATION

This application claims the priority benefit of Japan application serial No. 2018-242664, filed on Dec. 26, 2018. The entirety of the above-mentioned patent application is hereby incorporated by reference herein and made a part of this specification.

BACKGROUND OF THE DISCLOSURE

Technical Field

The disclosure relates to a fastening structure of electric member, a fastening method of electric member and a releasing method of electric member.

Related Art

Conventionally, for example, as a method for mounting an inverter unit on an electric motor, there is a method in which a three-phase connector arranged in the electric motor and a three-phase connector arranged in the inverter unit are directly connected, and thereby the electric motor and the inverter unit are fastened using a fastening screw while the electric motor and the inverter unit are electrically connected. In this method, in order that a load is not applied on the three-phase connectors at the time of connecting the electric motor and the inverter unit, it is necessary to move the inverter unit linearly along a connection direction of the three-phase connectors toward the electric motor in a state that the three-phase connectors of the electric motor and the inverter unit are accurately aligned.

Therefore, conventionally, as shown in FIG. 12 and FIG. 13, a guide pin 501 protruding down toward an electric motor 600 is arranged on a lower surface of an inverter unit 500, and a guide hole 601 into which the guide pin 501 of the inverter unit 500 can be inserted is arranged on an upper surface of the electric motor 600. By inserting the guide pin 501 into the guide hole 601, linear movement of the inverter unit 500 toward the electric motor 600 is guided while mutual positions of the inverter unit 500 and the electric motor 600 are regulated, and the inverter unit 500 and the electric motor 600 are integrally fastened by a fastening screw 700 arranged separately from the guide pin 501 and the guide hole 601 (for example, see patent literature 1).

LITERATURE OF RELATED ART

Patent Literature

[Patent literature 1] Japanese Laid-Open No. 2016-140199

However, when an inverter unit is held to be manually mounted to an electric motor, because a distal end of a guide pin protruding downward from the inverter unit is hard to be seen, a problem arises that the operation of aligning the guide pin with a guide hole to insert the guide pin into the guide hole is hard. Particularly, when the inverter unit is heavy, this work becomes increasingly hard.

In addition, the following problems also arise. That is, due to the arrangement of the guide pin in the inverter unit, not only the weight of the inverter unit is increased, but a size of load profile of the inverter unit is also increased due to the guide pin when the inverter unit is packed singly as a component, and transportation cost is increased.

SUMMARY (1) In the fastening structure of electric member according to the disclosure, a first electric member (for example, an electric motor 10 described later) and a second electric member (for example, an inverter unit 20 described later) respectively having electrical connection portions (for example, three-phase connectors 12a, 12b, 22a, 22b described later) are electrically connected by connection between the electrical connection portions in a state that mutual positions are regulated by guide pins (for example, guide pins 40, 40A described later), and fastening screws (for example, fastening screws 30 described later) which are inserted through fastening screw insertion holes (for example, fastening screw insertion holes 23a-23d described later) penetrating the second electric member are respectively screwed into a plurality of screw holes for fastening (for example, screw holes for fastening 13a-13d described later) having female screw portions (for example, female screw portions 134a-134d described later) arranged in the first electric member, and thereby the first electric member and the second electric member are fastened; at least one of the plurality of screw holes for fastening has large-diameter portions (for example, large-diameter portions 131a, 131c described later) which are arranged on a side of a screw hole entrance (for example, a screw hole entrance 130a described later) and into which a guide pin is detachably inserted, and small-diameter portions (for example, small-diameter portions 132a, 132c described later) which are arranged closer to a screw hole bottom (for example, a screw hole bottom 130b described later) than the large-diameter portions and equipped with the female screw portion; the female screw portions are not arranged in the large-diameter portions, and inner diameters of the large-diameter portions are larger than root diameters of the female screw portions; outer circumferential surfaces of the fastening screws which are screwed into the female screw portions and inner circumferential surfaces of the large-diameter portions are not in contact with each other.

(4) A fastening method of electric member according to the disclosure is a fastening method of an electric member comprising the fastening structure of electric member according to any one of (1)-(3), and includes: a first fastening process in which the guide pins (for example, guide pins 40, 40A described later) are protruded from the first electric member by inserting the guide pins into the large-diameter portions of the screw holes for fastening of the first electric member; a second fastening process in which the guide pins are inserted into the fastening screw insertion holes of the second electric member, the second electric member is moved along the guide pins in a direction approaching the first electric member, and the electrical connection portions are connected to each other during the movement; a third fastening process in which the fastening screws are inserted through the fastening screw insertion holes of the second electric member which the guide pins are not inserted through, and thereby the first electric member and the second electric member are fastened; a fourth fastening process in which the guide pins are pulled out and removed from the fastening screw insertion holes of the second electric member which the guide pins are inserted through; and a fifth fastening process in which the fastening screws are inserted through the fastening screw insertion holes of the second electric member from which the guide pins are removed, and thereby the first electric member and the second electric member are fastened.

(8) A releasing method of electric member according to the disclosure is a releasing method of an electric member comprising the fastening structure of electric member according to any one of 1-3 and includes: a first releasing process in which among a plurality of fastening screws for fastening a first electric member and a second electric member, the fastening screws which are screwed with the screw holes for fastening having large-diameter portions of the first electric member are removed; a second releasing process in which the guide pins are inserted through the fastening screw insertion holes of the second electric member from which the fastening screws are removed, and the guide pins are inserted into the large-diameter portions of the first electric member; a third releasing process in which the rest fastening screws of the plurality of fastening screws for fastening the first electric member and the second electric member are removed; a fourth releasing process in which the second electric member is moved along the guide pins in a direction away from the first electric member, and connection between the electrical connection portions is released during the movement; and a fifth releasing process in which the guide pins protruding from the first electric member are pulled out and removed from the large-diameter portions.

DESCRIPTION OF THE EMBODIMENTS

Embodiments of the disclosure are specifically described below with reference to drawings.

Furthermore, in the embodiments below, as two electric members which are mutually fastened, an electric motor and an inverter unit having an inverter for controlling drive of the electric motor are exemplified and described. However, the electric members in the disclosure are not limited to the electric motor and the inverter unit, and can be widely applied to electric members which are directly connected to each other by electrical connection portions such as connectors or the like and which are fastened by fastening screws.

[Fastening Structure of Electric Member]

Figure 1:
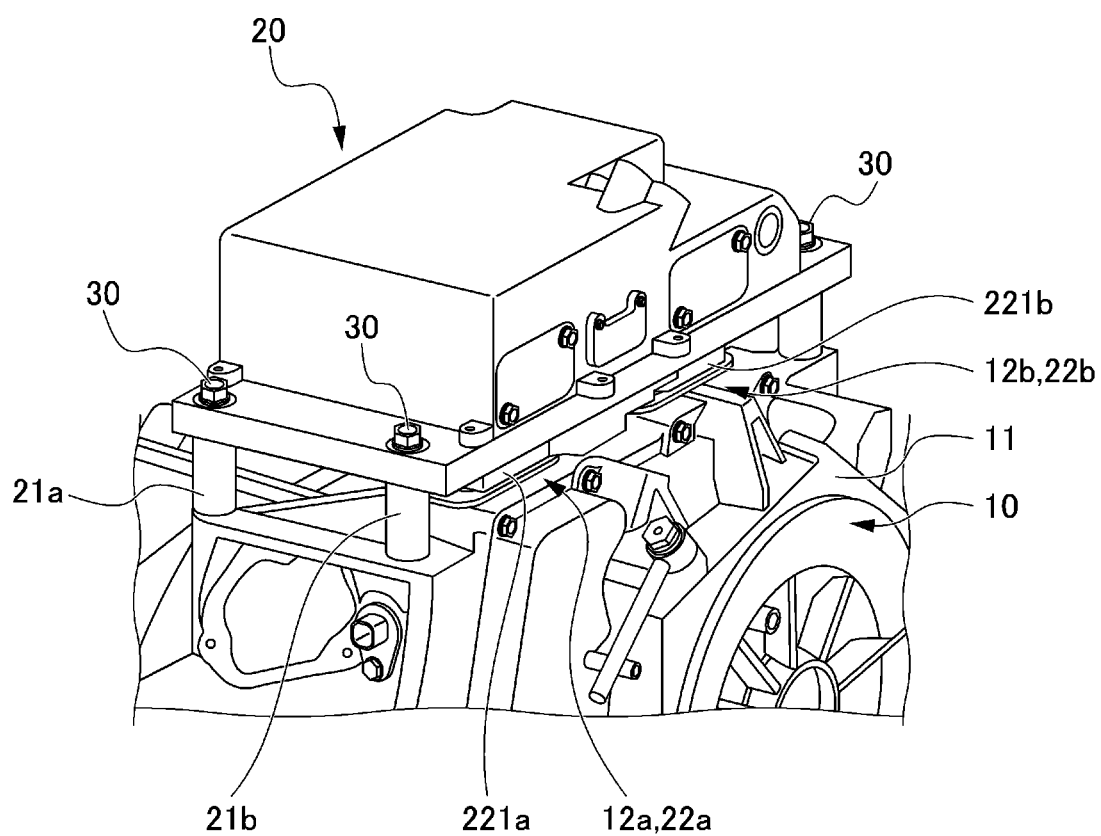
FIG. 1 is a perspective view showing main portions of a fastening part of an electric motor and an inverter unit which serves as one embodiment of a fastening structure of electric member according to the disclosure.

FIG. 1 is a perspective view showing main portions of a fastening part of an electric motor and an inverter unit which serves as one embodiment of a fastening structure of electric member according to the disclosure. As shown in FIG. 1, on the top of an electric motor 10 which serves as an electric member, an inverter unit 20 which serves as an electric member for controlling drive of the electric motor 10 is placed. In the embodiment, the electric motor 10 and the inverter unit 20 configure one portion of a drive unit for a hybrid vehicle. The electric motor 10 houses an electric motor body (not shown) within an electric motor case 11.

The inverter unit 20 is placed on the electric motor case 11. Four leg portions 21a-21d protruding toward the electric motor 10 are arranged at four corners of a lower surface of the inverter unit 20. The inverter unit 20 is placed on an upper surface of the electric motor case 11 by the leg portions 21a-21d and is integrally fastened by four fastening screws 30 penetrating the inside of each of the leg portions 21a-21d from the inverter unit 20 toward the electric motor 10. Furthermore, in FIG. 1, only three leg portions 21a, 21b, 21c of the four and three fastening screws 30 of the four are shown. The rest one leg portion 21d and one fastening screw 30 are invisible because they are arranged on a back side of the inverter unit 20 in FIG. 1.

The electric motor 10 and the inverter unit 20 are directly connected by two three-phase connectors 12a, 12b at a side of the electric motor 10 and two three-phase connectors 22a, 22b at a side of the inverter unit 20, the three-phase connectors being electrical connection portions corresponding to a U-phase, a V-phase, and a W-phase of the electric motor 10. Here, "directly connected" means that the three-phase connectors 12a, 12b at the side of the electric motor 10 and the three-phase connectors 22a, 22b at the side of the inverter unit 20 are electrically connected, not through a relay member such as a cable or the like, by movement of the electric motor 10 and the inverter unit 20 in a direction in which the electric motor 10 and the inverter unit 20 relatively approach each other.

Specifically, the two three-phase connectors 12a, 12b at the side of the electric motor 10 are arranged integrally with the electric motor case 11 in a manner of protruding upward from the upper surface of the electric motor case 11. The three-phase connector 12a has three terminal portions 122a protruding upward from an interphase insulating cover 121a, and the three-phase connector 12b has three terminal portions 122b protruding upward from an interphase insulating cover 121b (see FIG. 5A, FIG. 5B). The two three-phase connectors 12a, 12b have the same protrusion height.

On the other hand, the three-phase connectors 22a, 22b at the side of the inverter unit 20 are arranged integrally with the inverter unit 20 at positions corresponding to the three-phase connectors 12a, 12b at the side of the electric motor 10 on the lower surface of the inverter unit 20. The three-phase connectors 22a, 22b protrude from the inverter unit 20 toward the electric motor 10, the three-phase connector 22a has a guide cover 221a externally fitted to the interphase insulating cover 121a of the three-phase connector 12a at the side of the electric motor 10, and the three-phase connector 22b has a guide cover 221b externally fitted to the interphase insulating covers 121b of the three-phase connector 12b at the side of the electric motor 10. The two guide covers 221a, 221b have the same protrusion height. Inside the guide cover 221a and 221b, there are respectively three terminal portions (not shown) corresponding to the terminal portions 122a of the three-phase connectors 12a and the terminal portions 122b of the three-phase connector 12b at the side of the electric motor 10.

Figure 2:
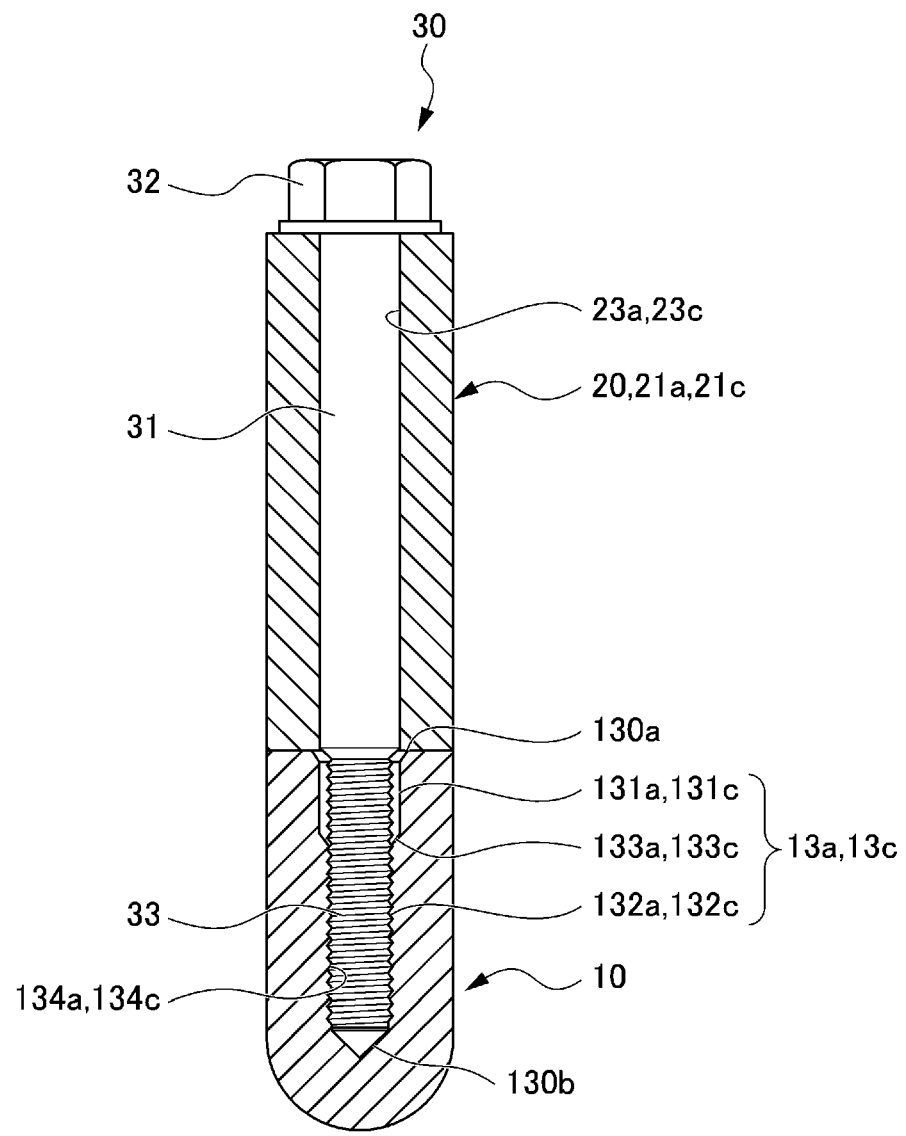
FIG. 2 is a sectional view showing a fastening site by a fastening screw of the electric motor and the inverter unit shown in FIG. 1.
Figure 3:
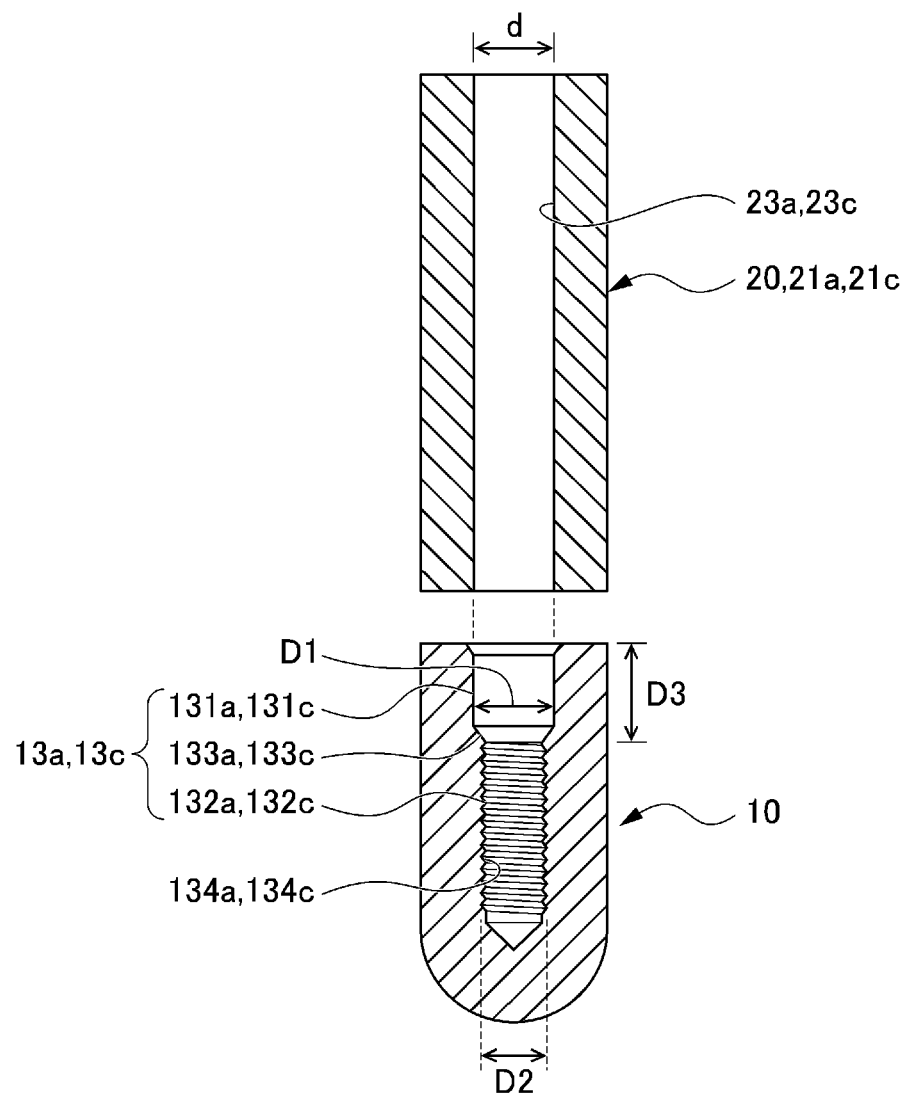
FIG. 3 is a sectional view in which a specific structure of the fastening site shown in FIG. 2 is exploded and illustrated.
Figure 4:
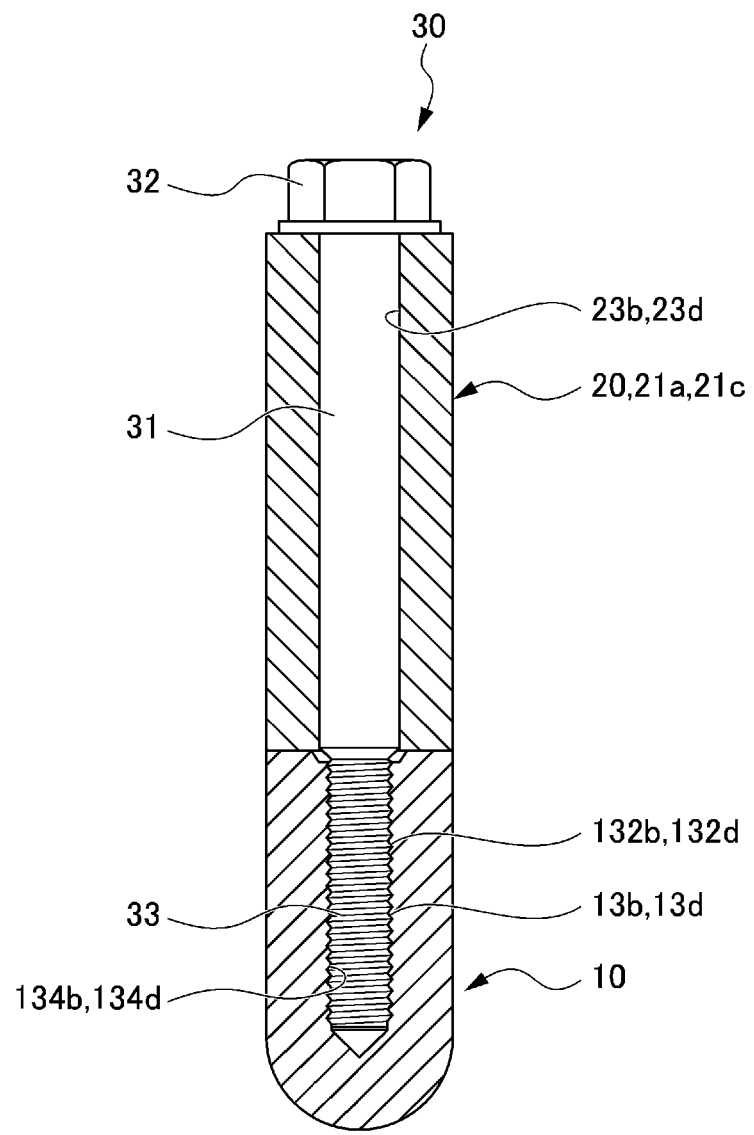
FIG. 4 is a sectional view showing another fastening site by a fastening screw of the electric motor and the inverter unit shown in FIG. 1.

Next, a structure of a fastening site of the electric motor 10 and the inverter unit 20 is described using FIG. 2 and FIG. 3. FIG. 2 is a sectional view showing the fastening site by fastening screws of the electric motor and the inverter unit shown in FIG. 1. In the embodiment, sections of fastening sites by two fastening screws 30 of the four fastening screw 30 are shown, the two fastening screws 30 being arranged at diagonal positions. FIG. 3 is a sectional view in which a specific structure of the fastening site shown in FIG. 2 is exploded and shown. In addition, FIG. 4 is a sectional view showing another fastening site by a fastening screw of the electric motor and the inverter unit shown in FIG. 1. In the embodiment, sections of fastening sites by two fastening screws 30 are shown, the two fastening screws 30 being arranged at the rest diagonal positions.

As shown in FIGS. 2-4, fastening screw insertion holes 23a-23d are arranged penetrating the leg portions 21a-21d of the inverter unit 20. Each of the fastening screw insertion holes 23a-23d has the same diameter and the same length. In addition, screw holes for fastening 13a-13d for screwing the fastening screws 30 are arranged corresponding to the fastening screw insertion holes 23a-23d in the electric motor case 11 of the electric motor 10. The fastening screws 30 are inserted from above the inverter unit 20 into the fastening screw insertion holes 23a-23d and are inserted into the screw holes for fastening 13a-13d of the electric motor 10 penetrating the fastening screw insertion holes 23a-23d.

Here, the fastening screws 30 are described with reference to FIG. 2 and FIG. 4. The four fastening screws 30 have the same structure. The fastening screw 30 has a cylindrical shaft portion 31, a hexagonal head 32 arranged on an upper end of the shaft portion 31, and a male screw portion 33 arranged on an outer circumferential surface at a lower end side of the shaft portion 31. An outer diameter (a thread diameter) of the male screw portion 33 in the embodiment is slightly smaller than an outer diameter of the shaft portion 31. The male screw portions 33 are arranged in sites protruding from lower ends of the leg portions 21a-21d of the inverter unit 20 in a fastening state of the electric motor 10 and the inverter unit 20. Therefore, by screwing the male screw portions 33 of the distal ends and female screw portions 134a-134d arranged on inner circumferential surfaces of the screw holes for fastening 13a-13d, the fastening screws 30 inserted into the screw holes for fastening 13a-13d fasten the electric motor 10 and the inverter unit 20 integrally.

As shown in FIG. 2 and FIG. 3, the two screw holes for fastening 13a, 13c among the four screw holes for fastening 13a-13d of the electric motor 10 and arranged at the diagonal positions have large-diameter portions 131a, 131c and small-diameter portions 132a, 132c. Between the large-diameter portions 131a, 131c and the small-diameter portions 132a, 132c, there are tapered portions 133a, 133c which gradually decrease in diameter from the large-diameter portions 131a, 131c to the small-diameter portions 132a, 132c. Therefore, in the screw holes for fastening 13a, 13c, the large-diameter portions 131a, 131c, the tapered portions 133a, 133c, and the small-diameter portions 132a, 132c are continuously arranged in this order along an axial direction from the side of a screw hole entrance 130a.

The large-diameter portions 131a, 131c are arranged at a side of the screw hole entrance 130a in the screw holes for fastening 13a, 13c. On inner circumferential surfaces of the large-diameter portions 131a, 131c, female screw portions screwed with the male screw portions 33 of the fastening screw 30 are not arranged. As specifically described below, the large-diameter portions 131a, 131c function as guide pin insertion portions into which guide pins used during fastening or releasing of the electric motor 10 and the inverter unit 20 are detachably inserted. The guide pins do not remain in the electric motor 10 and the inverter unit 20 after the electric motor 10 and the inverter unit 20 are fastened by the fastening screws 30.

The small-diameter portions 132a, 132c are arranged closer to the side of a screw hole bottom 130b than the large-diameter portions 131a, 131c in the screw holes for fastening 13a, 13c. In the screw holes for fastening 13a, 13c, the female screw portions 134a, 134c which are screwed with the male screw portions 33 of the fastening screws 30 are only arranged on the inner circumferential surfaces of the small-diameter portions 132a, 132c.

Inner diameters D1 of the large-diameter portions 131a, 131c are greater than root diameters D2 of the female screw portions 134a, 134c of the small-diameter portions 132a, 132c. Therefore, as shown in FIG. 2, between the outer circumferential surfaces (the male screw portions 33) of the fastening screws 30 which are inserted into the screw holes for fastening 13a, 13c and the inner circumferential surfaces of the large-diameter portions 131a, 131c, predefined gaps are formed, and the outer circumferential surfaces of the fastening screws 30 and the inner circumferential surfaces of the large-diameter portions 131a, 131c are not in contact with each other. Accordingly, the inner circumferential surfaces of the large-diameter portions 131a, 131c can be prevented from being damaged due to the contact with the male screw portions 33 of the fastening screws 30, and there is no risk of affecting dimensional accuracy for erecting the guide pins described later with high accuracy.

In addition, the inner diameters D1 of the large-diameter portions 131a, 131c are set to be equal to or smaller than inner diameters d of the fastening screw insertion holes 23a, 23c of the inverter unit 20. Therefore, the guide pins described later are inserted into the fastening screw insertion holes 23a, 23c of the inverter unit 20 and are detachable with respect to the large-diameter portions 131a, 131c of the screw holes for fastening 13a, 13c of the electric motor 10. Furthermore, in the embodiment, it is set that D1=d.

Axially lengths (depths) D3 of the large-diameter portions 131a, 131c are not particularly limited, and are set to lengths (depths) with which guide pins 40 can sufficiently withstand lateral loads and maintain an erection state when the guide pins described later are inserted into the large-diameter portions 131a, 131c and erected in the electric motor 10.

As shown in FIG. 4, the screw holes for fastening 13b, 13d of the electric motor 10 into which the fastening screws 30b, 30d are inserted only have the small-diameter portions 132b, 132d but do not have large-diameter portions. Therefore, the female screw portions 134b, 134d of the screw holes for fastening 13b, 13d are arranged over substantially the entire lengths of the screw holes for fastening 13b, 13d. Depths of the screw holes for fastening 13b, 13d which only have the small-diameter portions 132b, 132d are the same as the depths of the screw holes for fastening 13a, 13c which have the large-diameter portions 131a, 131c.

According to this fastening structure of the electric motor 10 and the inverter unit 20, as specifically described later, the guide pins are inserted into the large-diameter portions 131a, 131c of the screw holes for fastening 13a, 13c in the electric motor 10 and are protruded from the electric motor 10, and thereby alignment of the electric motor 10 and the inverter unit 20 using the guide pins is possible. The guide pins 40 are detachable from the large-diameter portions 131a, 131c, and thus after the guide pins 40 are removed, the guide pins 40 do not remain in either of the electric motor 10 and the inverter unit 20. Therefore, weight increase or size increase of load profile of the electric motor 10 and the inverter unit 20 due to the guide pins 40 is not caused.

[Fastening Method of Electric Member]

Figure 6:
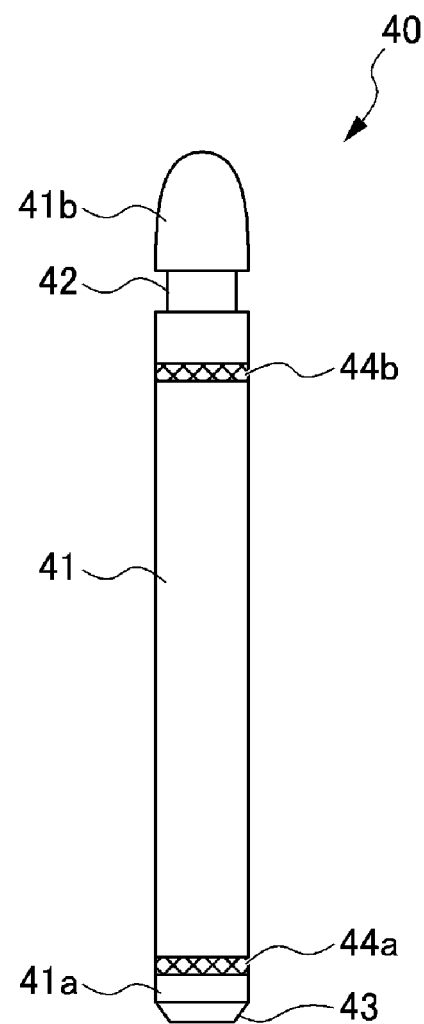
FIG. 6 is a front view showing one example of a guide pin used in the fastening method and releasing method of electric member according to the disclosure.
Figure 7A:
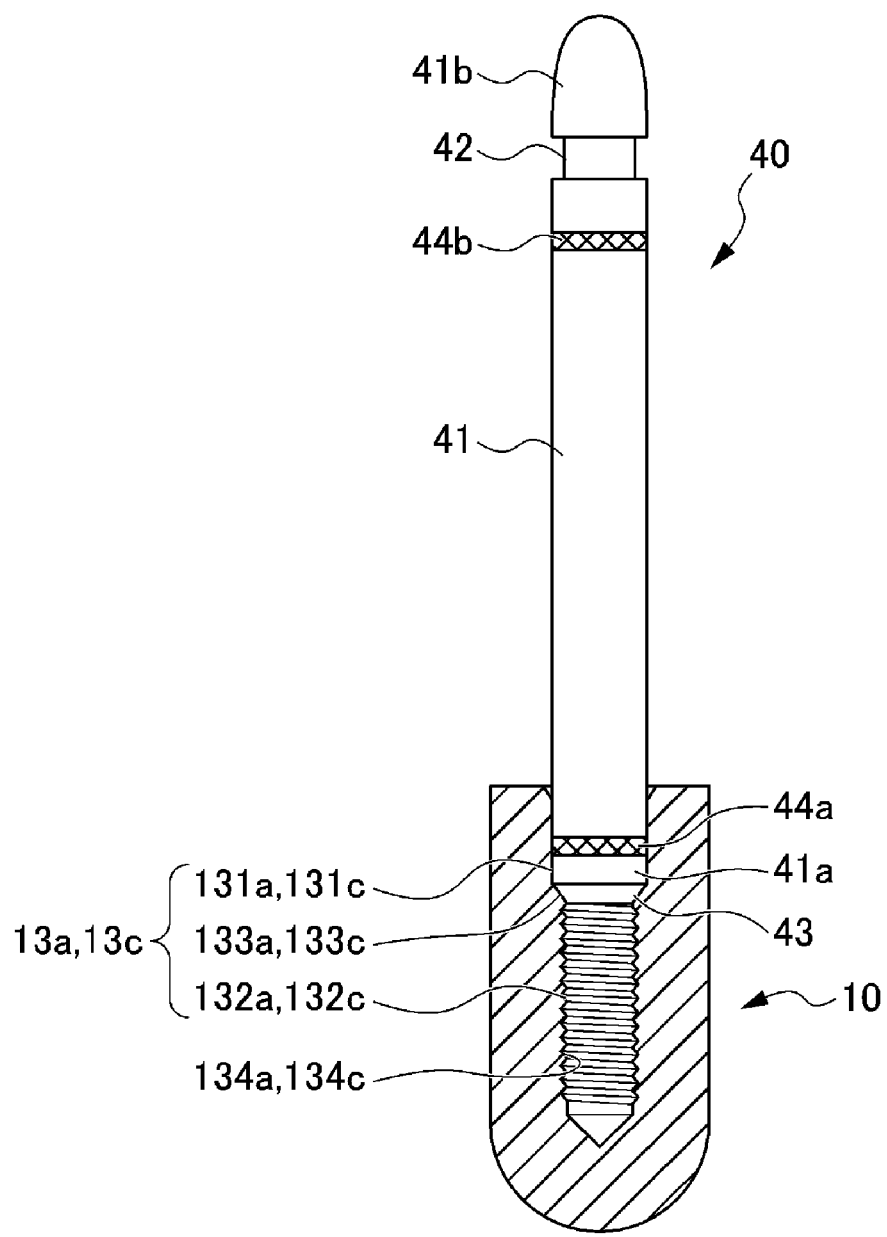
FIG. 7A is a diagram showing a situation when the guide pin is inserted into a correct position in the fastening method of electric member according to the disclosure.
Figure 7B:
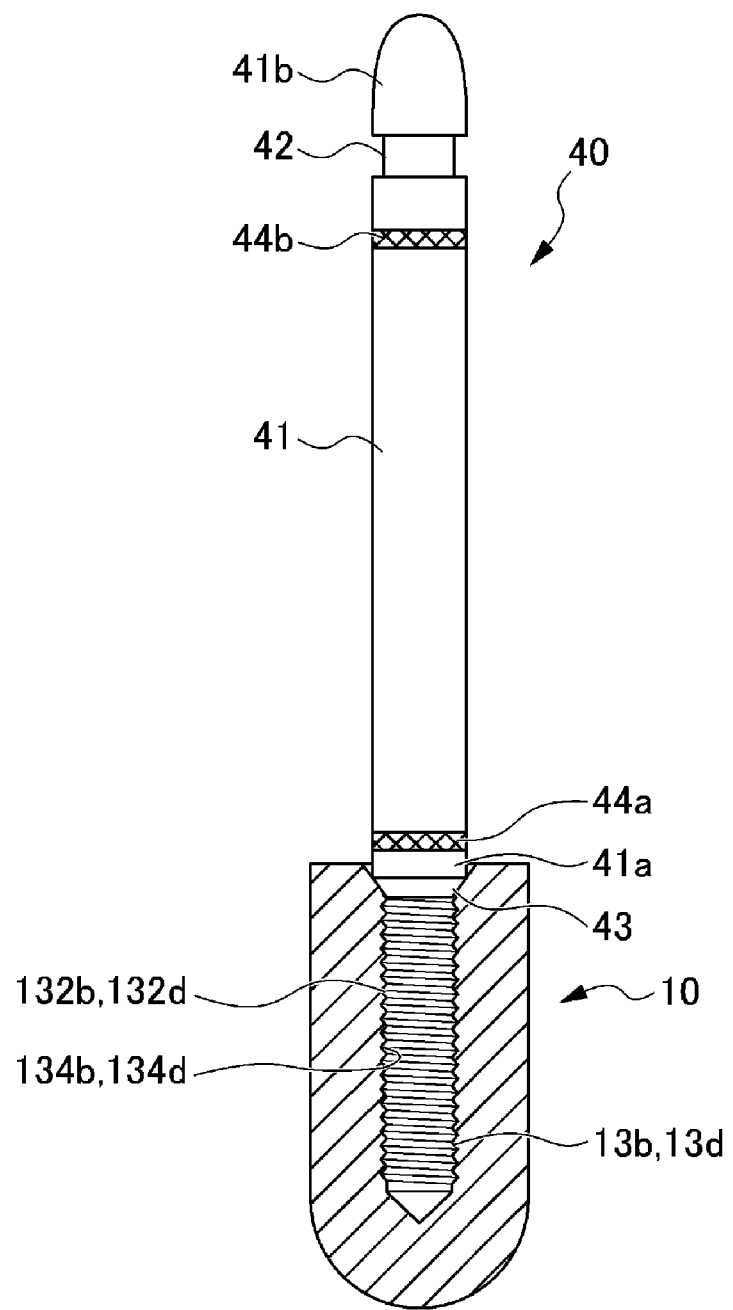
FIG. 7B is a diagram showing a situation when the guide pin is inserted into an incorrect position in the fastening method of electric member according to the disclosure.

Next, a specific method for fastening the electric motor 10 and the inverter unit 20 is described with reference to FIGS. 5A-5E, FIG. 6, FIG. 7A, FIG. 7B and FIGS. 8A-8D. FIGS. 5A-5E are diagrams illustrating the fastening method of electric member according to the disclosure. FIG. 6 is a front view showing one example of a guide pin used in the fastening method of electric member according to the disclosure. FIG. 7A is a diagram showing a situation when the guide pin is inserted into a correct position in the fastening method of electric member according to the disclosure. FIG. 7B is a diagram showing a situation when the guide pin is inserted into an incorrect position in the fastening method of electric member according to the disclosure. FIGS. 8A-8D are diagrams illustrating situations of connection between electrical connection portions in the fastening method of electric member according to the disclosure.

Figure 5A:
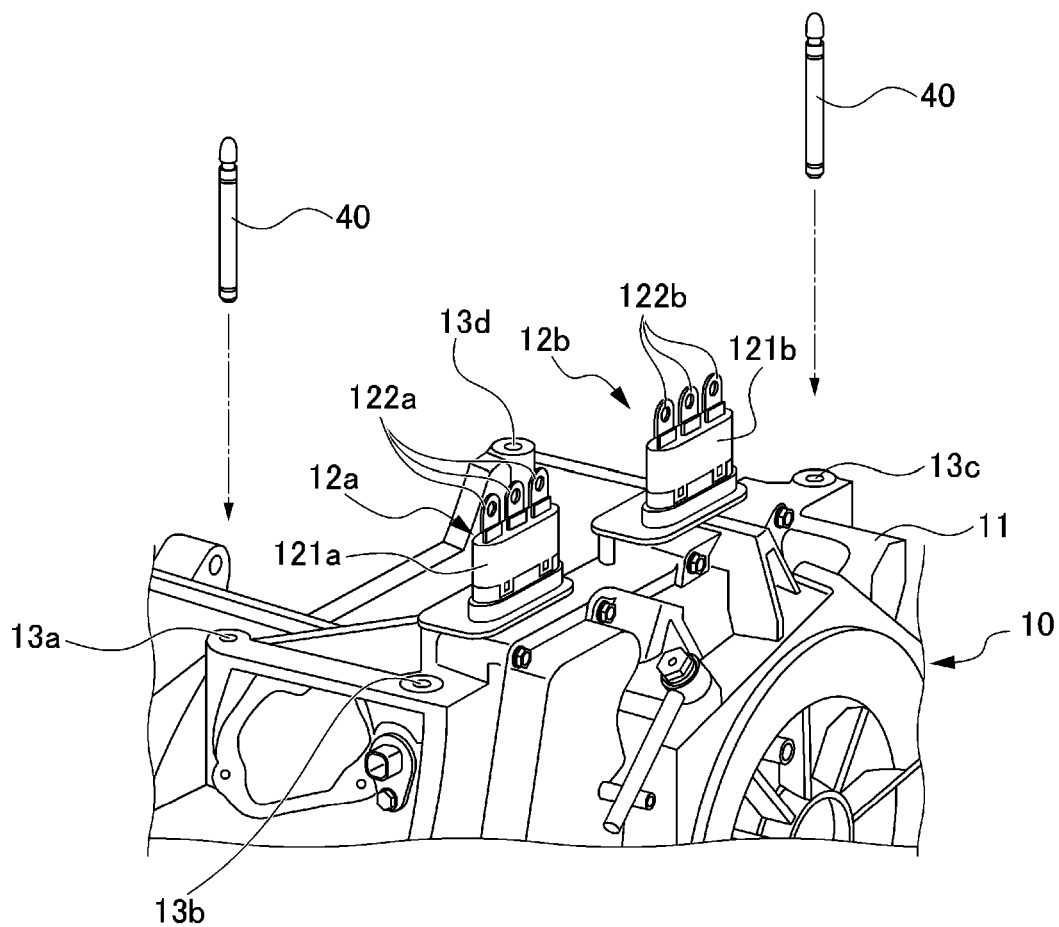
FIG. 5A is a diagram illustrating a fastening method of electric member according to the disclosure.

As shown in FIG. 5A, on the upper surface of the electric motor case 11 of the electric motor 10, the four screw holes for fastening 13a-13d for placing and fastening the inverter unit 20 are opened. The two screw holes for fastening 13a, 13c among the four and arranged at the diagonal position are screw holes having the above large-diameter portions 131a, 131c. The two three-phase connectors 12a, 12b protrude from the upper surface of the electric motor case 11.

First, in the electric motor 10, the guide pins 40 are respectively inserted into the two screw holes for fastening 13a, 13c having the large-diameter portions 131a, 131c, and thereby two guide pins 40 are protruded from the electric motor 10 (a first fastening process).

The two guide pins 40 have the same structure. As shown in FIG. 6, the guide pin 40 has a long cylindrical shaft portion 41. An outer diameter of the shaft portion 41 is substantially equal to the inner diameters D1 of the large-diameter portions 131a, 131c. Therefore, the guide pin 40 is attached without rattling inside the large-diameter portions 131a, 131c by inserting a base end portion 41a of the shaft portion 41 into the large-diameter portions 131a, 131c. In addition, as shown in FIG. 5C, a length of the guide pin 40 is set to such a length that the side of a distal end portion 41b of the guide pin 40 protrudes from the fastening screw insertion holes 23a, 23c penetrating the fastening screw insertion holes 23a, 23c of the inverter unit 20 when the inverter unit 20 is placed on the top of the electric motor 10 using the guide pin 40. The distal end portion 41b of the guide pin 40 is formed in a tapered shape in order to be easily inserted into the fastening screw insertion holes 23a, 23c of the inverter unit 20.

On an outer circumferential surface at the side of the distal end portion 41b of the guide pin 40, a groove portion 42 which partially has a small diameter is arranged. The groove portion 42 is a site engaged with a jig (not shown) for pull-out operation when the guide pin 40 is pulled out and removed from the fastening screw insertion holes 23a, 23c of the inverter unit 20. Due to the groove portion 42, the guide pin 40 can be easily pulled out using the jig.

In addition, a peripheral edge of the base end portion 41a of the guide pin 40 has a chamfered portion 43 which is chamfered into a tapered shape corresponding to the tapered portions 133a, 133c of the screw holes for fastening 13a, 13c. Therefore, when the guide pin 40 is inserted into the large-diameter portions 131a, 131c of the screw holes for fastening 13a, 13c, the chamfered portion 43 is seated on the tapered portions 133a, 133c, and thereby the guide pin 40 is stably attached inside the large-diameter portions 131a, 131c.

A first mark portion 44a is arranged on an outer circumferential surface of the guide pin 40. The first mark portion 44a is a site which is a warning mark for visibly confirming whether the guide pin 40 is correctly inserted into the screw holes for fastening 13a, 13c having the large-diameter portions 131a, 131c. The first mark portion 44a is formed by filling paint or the like in a groove formed on an outer circumferential surface of the shaft portion 41, and does not protrude from the outer circumferential surface of the shaft portion 41.

The first mark portion 44a is arranged close to the base end portion 41a of the guide pin 40. Specifically, the first mark portion 44a is, as shown in FIG. 7A, arranged hidden inside the large-diameter portions 131a, 131c and becomes invisible from the outside in a state that the base end portion 41a of the guide pin 40 is correctly inserted into the large-diameter portions 131a, 131c of the screw holes for fastening 13a, 13c, and, as shown in FIG. 7B, is arranged outside of the screw holes for fastening 13b, 13d and becomes visible from the outside in a state that the base end portion 41a of the guide pin 40 is incorrectly inserted into the screw holes for fastening 13b, 13d not having the large-diameter portions 131a, 131c. Therefore, in the first fastening process, whether the guide pins 40 are correctly inserted into the large-diameter portions 131a, 131c of the screw holes for fastening 13a, 13c can be easily confirmed according to whether the first mark portions 44a of the guide pins 40 erected in the electric motor 10 are visible.

Figure 5B:
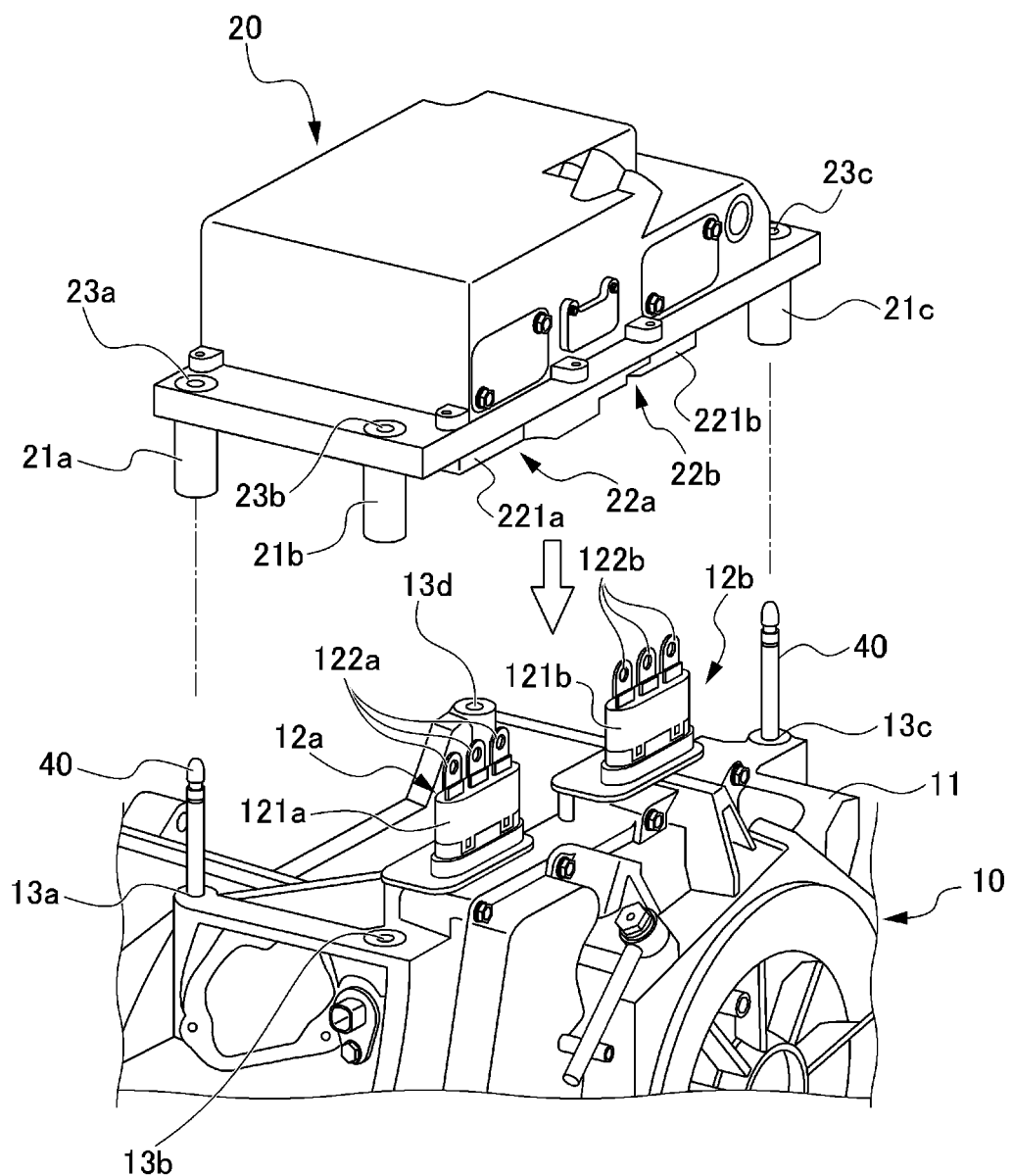
FIG. 5B is a diagram illustrating the fastening method of electric member according to the disclosure.
Figure 5C:
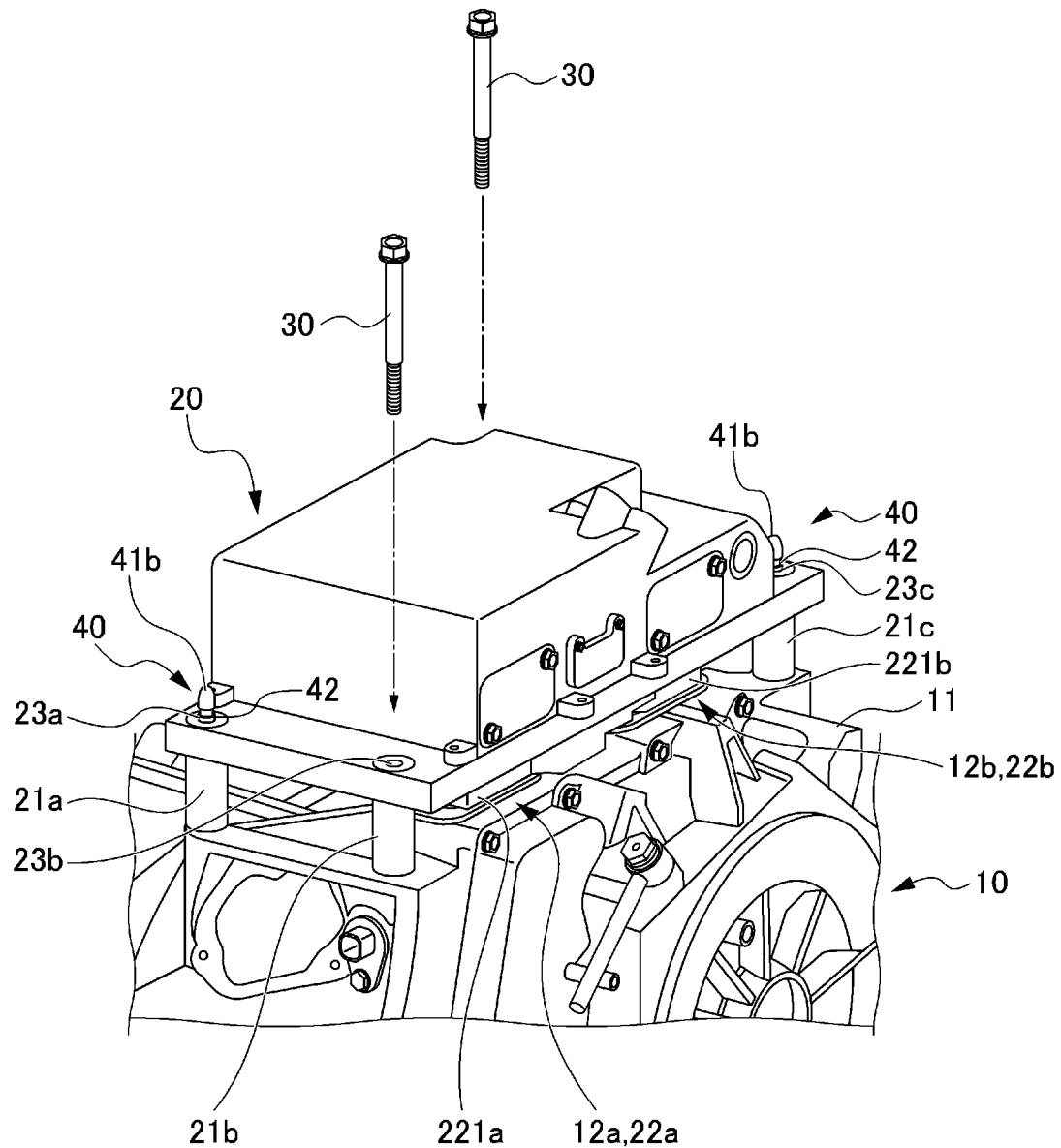
FIG. 5C is a diagram illustrating the fastening method of electric member according to the disclosure.

Next, as shown in FIG. 5B, the inverter unit 20 is arranged above the electric motor 10 in which two guide pins 40 are erected, and by gradually lowering the inverter unit 20, the guide pins 40 are insert through the fastening screw insertion holes 23a, 23c of the inverter unit 20 corresponding to positions of the guide pins 40 (a second fastening process). At this time, even when the guide pins 40 are invisibly operated while the inverter unit 20 is held by hand, the operation can be performed while attaching the hand to the fastening screw insertion holes 23a, 23c from below to find positions of the distal end portions 41b of the guide pins 40, and thus the insertion operation can be performed easily.

In the second fastening process, after the distal end portions 41b of the guide pins 40 are respectively inserted into the fastening screw insertion holes 23a, 23c, the inverter unit 20 is linearly moved along the guide pins 40 in a direction approaching the electric motor 10. Because the two guide pins 40 are arranged in diagonal positions, the inverter unit 20 can be linearly moved toward the electric motor 10 in a state that lateral movement is regulated. The three-phase connectors 12a, 12b at the side of the electric motor 10 and the three-phase connectors 22a, 22b at the side of the inverter unit 20 are electrically connected during the process in which the inverter unit 20 is moved toward the electric motor 10.

Because the three-phase connectors 12a, 12b and the three-phase connectors 22a, 22b are electrically connected in the same way, here, a situation of electrical connection of the three-phase connector 12b at the side of the electric motor 10 and the three-phase connector 22b at the side of the inverter unit 20 is further specifically described using FIGS. 8A-8D.

Figure 8A:
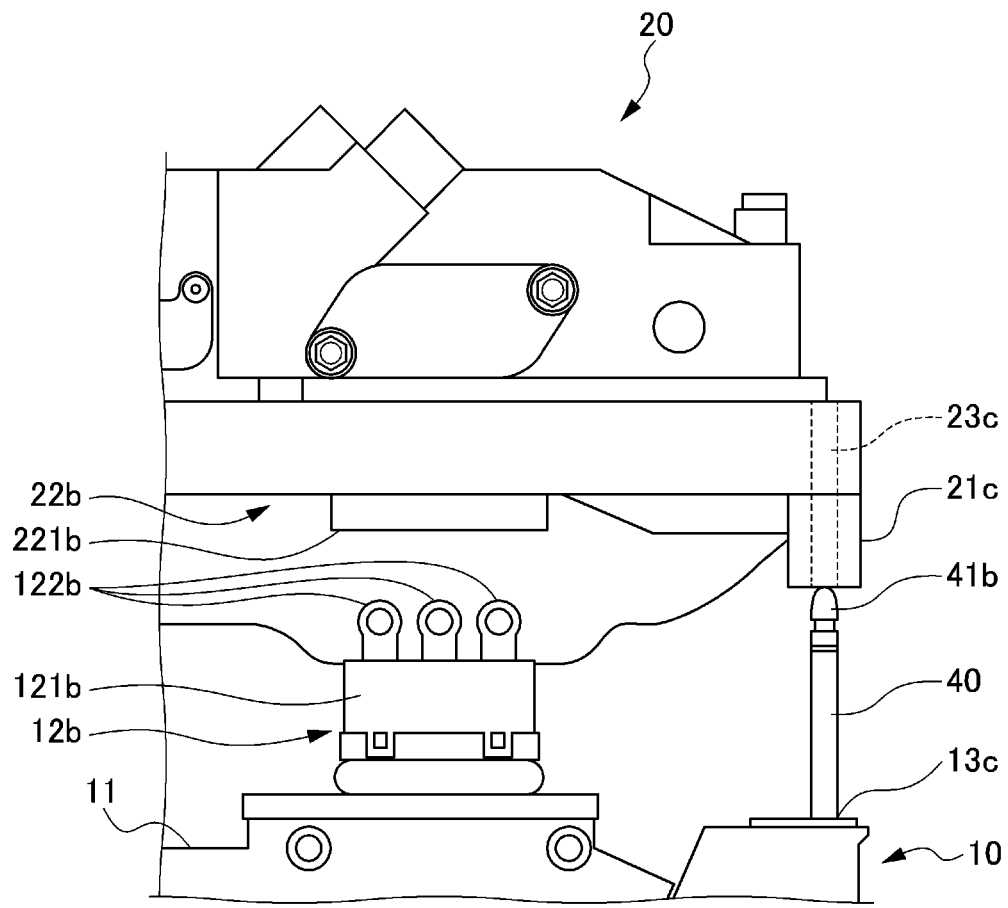
FIG. 8A is a diagram for illustrating a situation of connection between the electrical connection portions in the fastening method of electric member according to the disclosure.

In a state before the distal end portion 41 of the guide pin 40 is inserted into the fastening screw insertion hole 23c of the inverter unit 20, the three-phase connectors 12b, 22b are not in connect with each other. That is, the guide cover 221b of the three-phase connector 22b at the side of the inverter unit 20 is separated from the terminal portion 122b of the three-phase connector 12b at the side of the electric motor 10 (FIG. 8A).

Figure 8B:
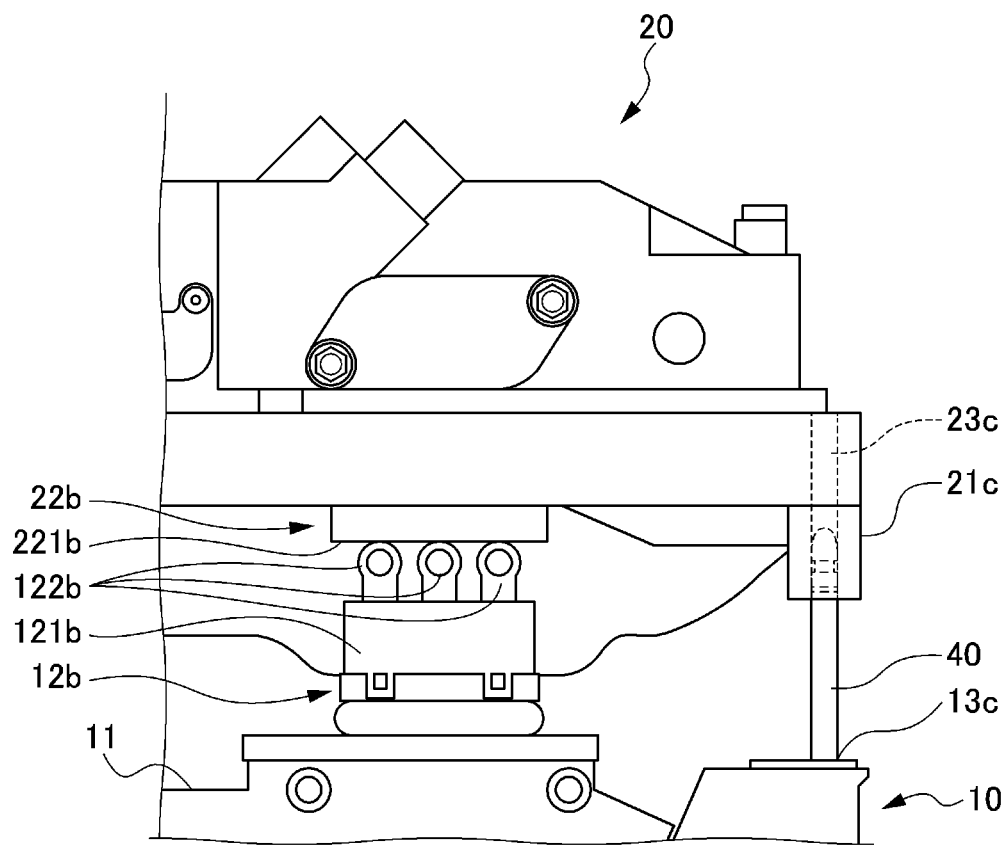
FIG. 8B is a diagram for illustrating a situation of the connection between the electrical connection portions in the fastening method of electric member according to the disclosure.

Next, if the inverter unit 20 is further moved toward the electric motor 10, at first, the distal end portion 41b of the guide pin 40 is inserted into the fastening screw insertion hole 23c. Accordingly, the electric motor 10 are aligned with the inverter unit 20, and mutual lateral movements are regulated. At this time, the three-phase connector 22b at the side of the inverter unit 20 is still separated from the three-phase connector 12b at the side of the electric motor 10, and the guide cover 221b of the three-phase connector 22b at the side of the inverter unit 20 does not interfere with the terminal portion 122b of the three-phase connector 12b at the side of the electric motor 10 (FIG. 8B).

Figure 8C:
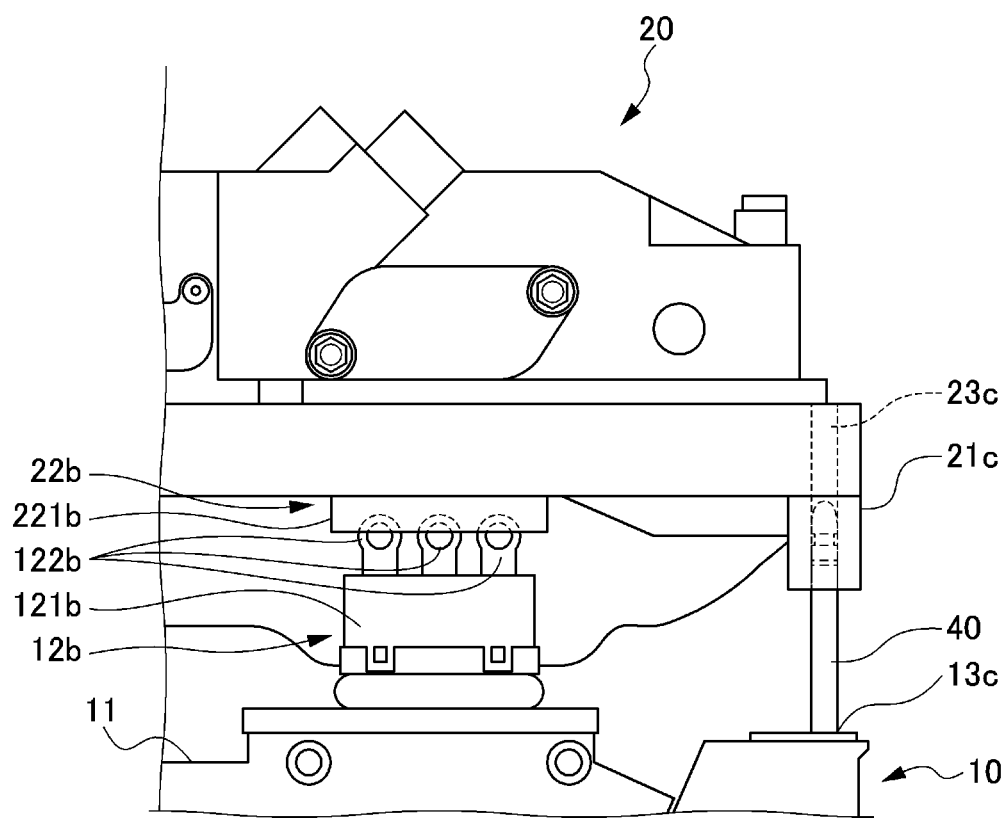
FIG. 8C is a diagram illustrating a situation of the connection between the electrical connection portions in the fastening method of electric member according to the disclosure.
Figure 8D:
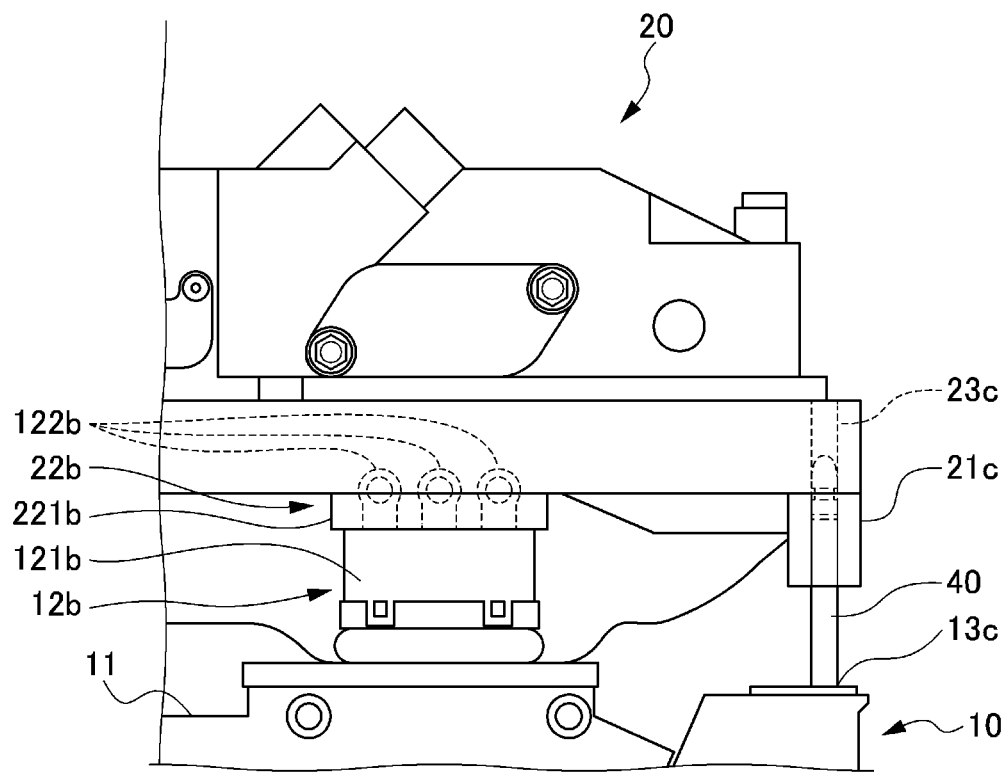
FIG. 8D is a diagram illustrating a situation of the connection between the electrical connection portions in the fastening method of electric member according to the disclosure.

If the inverter unit 20 is guided by the guide pin 40 to be further moved toward the electric motor 10, the terminal portion 122b of the three-phase connector 12b at the side of the electric motor 10 is insert into the guide cover 221b of the three-phase connector 22b at the side of the inverter unit 20 (FIG. 8C). Thereafter, the guide cover 221b of the three-phase connector 22b at the side of the inverter unit 20 is externally fitted to the interphase insulating cover 121b of the three-phase connector 12b at the side of the electric motor 10, and the terminal portions are eventually electrically connected (FIG. 8D).

The above-mentioned electrical connection between the three-phase connectors 12b, 22b is linearly performed in a state that the movement of the inverter unit 20 is guided along the guide pin 40 and thereby the electric motor 10 is aligned with the inverter unit 20 at an appropriate position and the mutual lateral movements are regulated. Therefore, when the three-phase connectors 12b, 22b are connected to each other, no load is applied to the connection site between the two.

As shown in FIG. 5C, in a state that the electrical connection is finished and the inverter unit 20 is placed on the electric motor 10, the distal end portions 41b of the guide pins 40 respectively protrude from the fastening screw insertion holes 23a, 23c of the inverter unit 20. Therefore, next, the fastening screws 30 are inserted through the rest fastening screw insertion holes 23b, 23d of the inverter unit 20 which the guide pins 40 are not inserted through and the fastening screws 30 are screwed with the female screw portions 134b, 134d of the screw holes for fastening 13b, 13d of the electric motor 10, and thereby the electric motor 10 and the inverter unit 20 are fastened (a third fastening process).

Figure 5D:
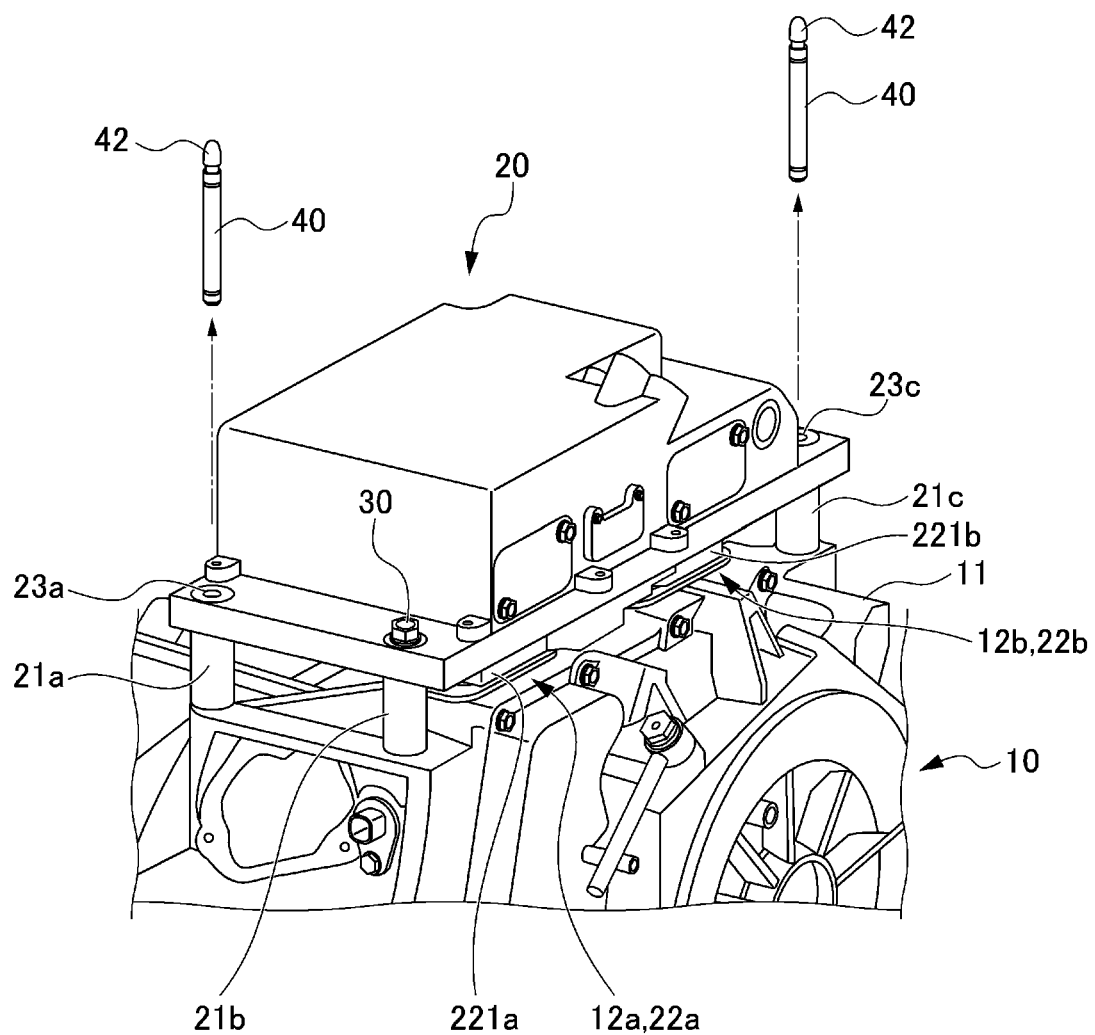
FIG. 5D is a diagram illustrating the fastening method of electric member according to the disclosure.

Next, as shown in FIG. 5D, the guide pins 40 are pulled out and removed from the fastening screw insertion holes 23a, 23c of the inverter unit 20 which the guide pins 40 are inserted through (a fourth fastening process). The pull-out operation of the guide pins 40 can be performed easily by the jig not shown using the groove portions 42 of the distal end portions 41b of the guide pins 40 which protrude from the fastening screw insertion holes 23a, 23c.

Figure 5E:
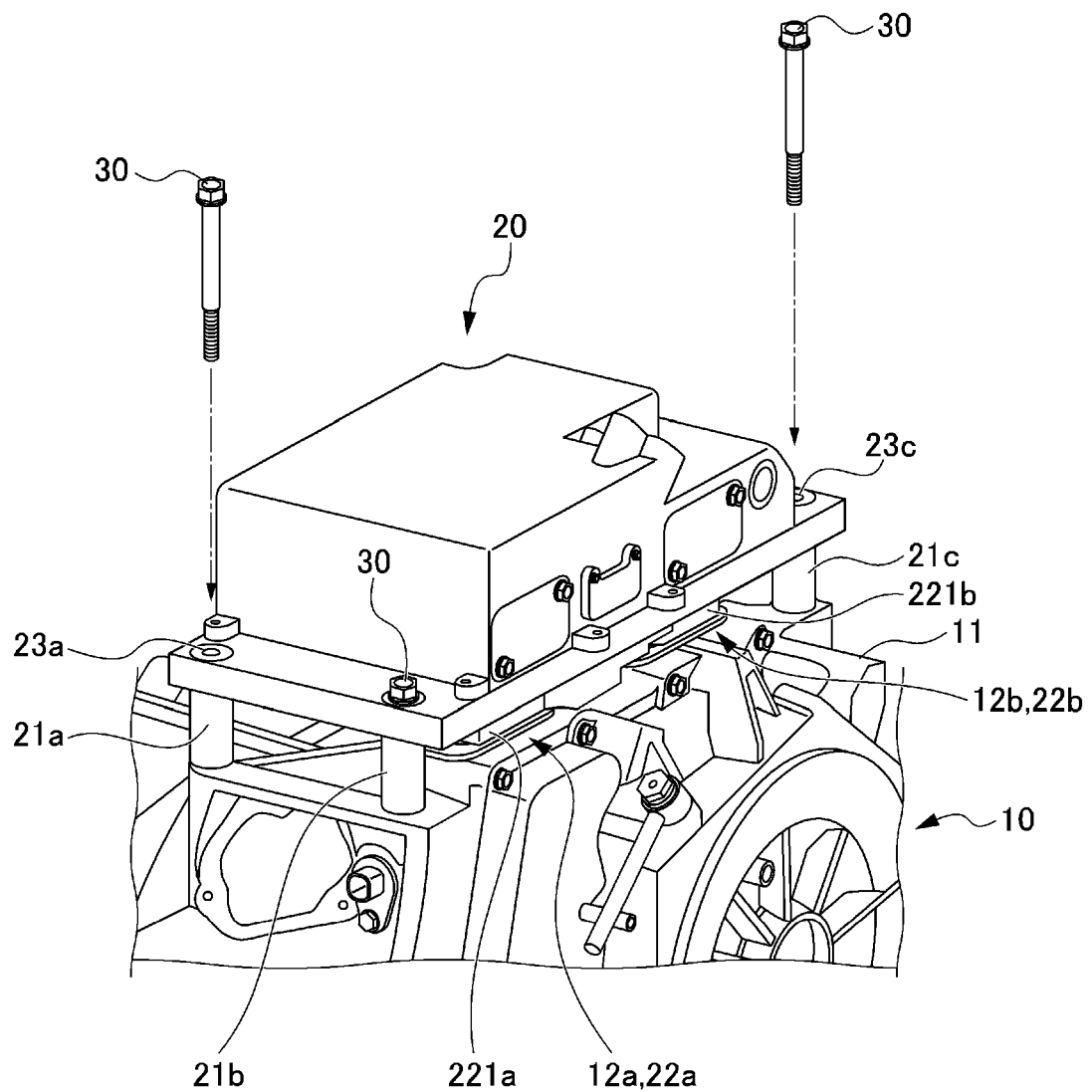
FIG. 5E is a diagram illustrating the fastening method of electric member according to the disclosure.

Thereafter, as shown in FIG. 5E, the fastening screws 30 are respectively inserted through the fastening screw insertion holes 23a, 23c of the inverter unit 20 after the guide pins 40 are removed and the fastening screws 30 are screwed with the female screw portions 134a, 134c of the screw holes for fastening 13a, 13c of the electric motor 10, and thereby the electric motor 10 and the inverter unit 20 are fastened (a fifth fastening process).

According to this fastening method, the electric motor 10 and the inverter unit 20 can be fastened while mutual positions of the electric motor 10 and the inverter unit 20 are regulated using the guide pins 40. Moreover, the guide pins 40 are removed from the electric motor 10 and the inverter unit 20 being fastened and thus do not remain. Therefore, the weight increase or the size increase of the load profile of the electric motor 10 and the inverter unit 20 due to the guide pins 40 is not caused.

[Releasing Method of Electric Member]

Next, a specific method for releasing the fastening of the electric motor 10 and the inverter unit 20 is described with reference to FIGS. 9A-9D, FIG. 10A, and FIG. 10B.

FIGS. 9A-9D are diagrams illustrating the releasing method of electric member according to the disclosure. FIG. 10A is a diagram showing a situation when the guide pin is inserted into a correct position in the releasing method of electric member according to the disclosure. FIG. 10B is a diagram showing a situation when the guide pin is inserted into an incorrect position in the releasing method of electric member according to the disclosure.

Figure 9A:
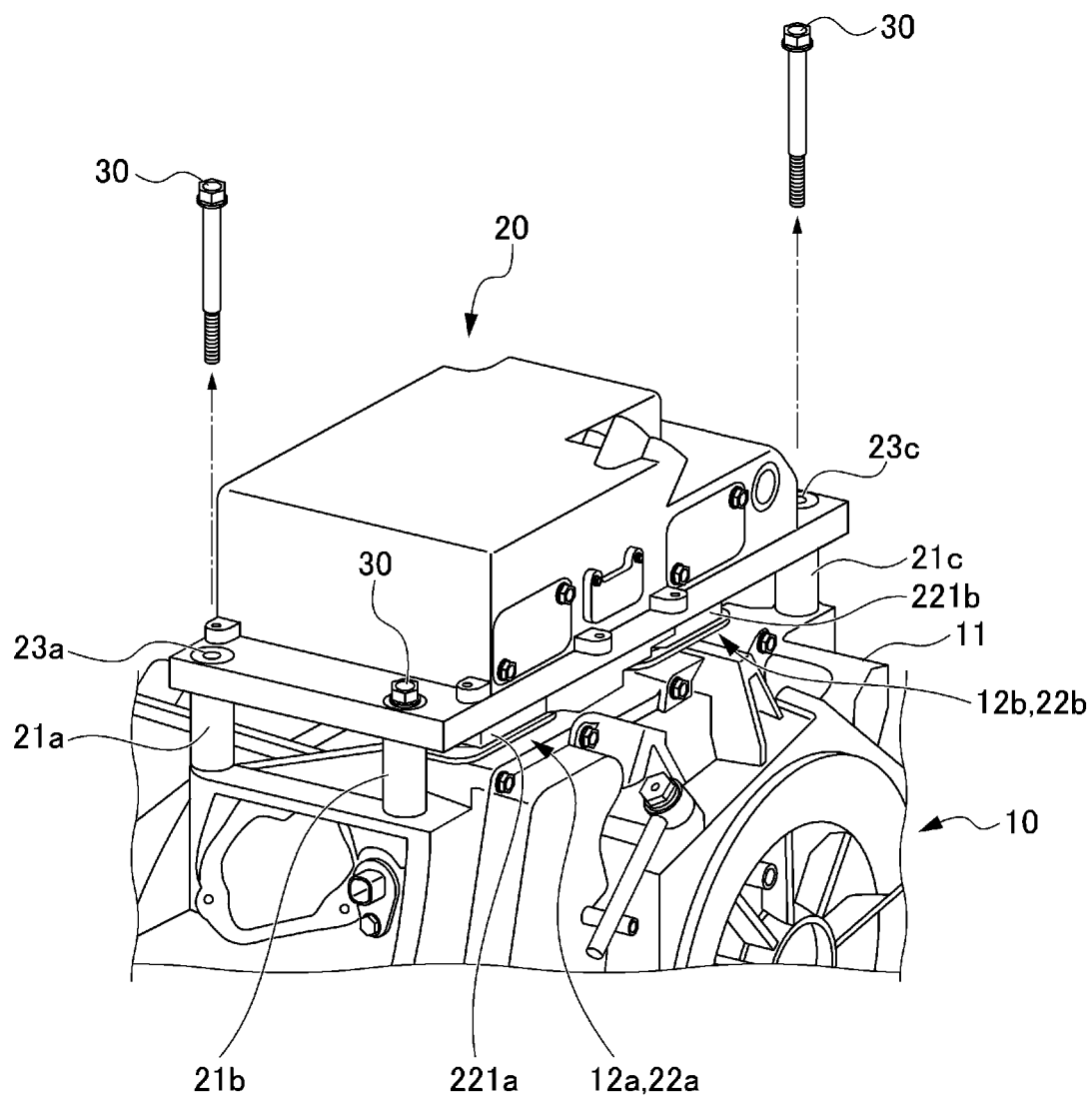
FIG. 9A is a diagram illustrating the releasing method of electric member according to the disclosure.
Figure 10A:
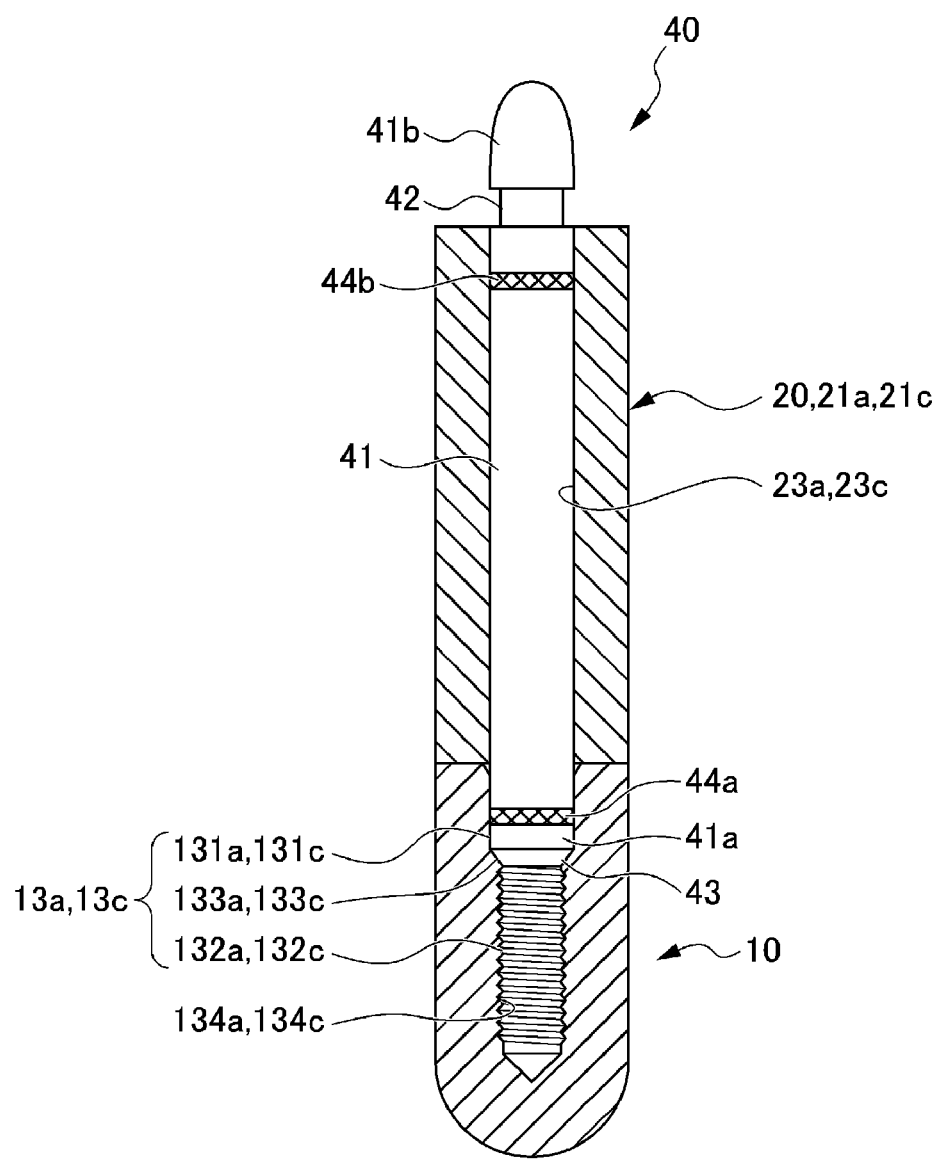
FIG. 10A is a diagram showing a situation when the guide pin is inserted into a correct position in the releasing method of electric member according to the disclosure.
Figure 10B:
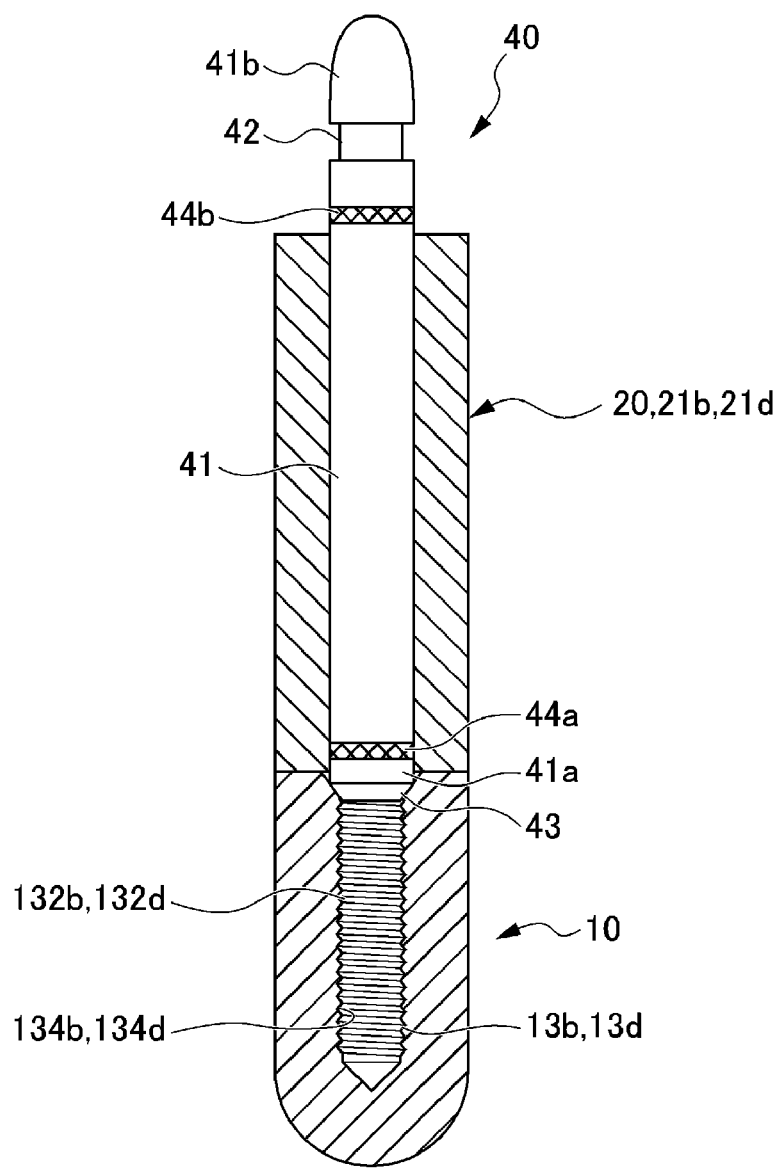
FIG. 10B is a diagram showing a situation when the guide pin is inserted into an incorrect position in the releasing method of electric member according to the disclosure.

First, as shown in FIG. 9A, two fastening screws 30 among the four fastening screws 30 that fasten the electric motor 10 and the inverter unit 20 are removed, the two fastening screws 30 being screwed into the screw holes for fastening 13a, 13c having the large-diameter portions 131a, 131c at the side of the electric motor 10 (a first releasing process).

Figure 9B:
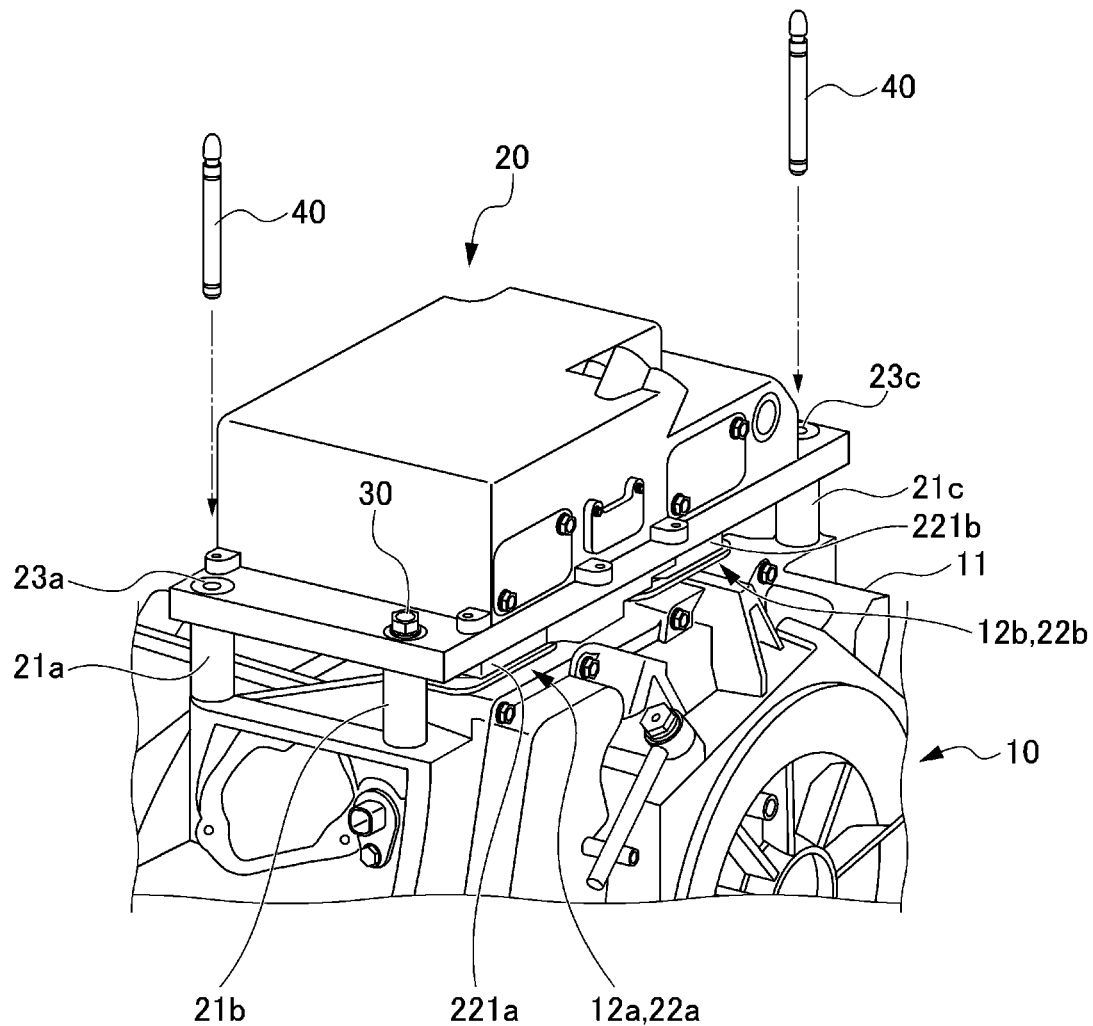
FIG. 9B is a diagram illustrating the releasing method of electric member according to the disclosure.

Next, as shown in FIG. 9B, the guide pins 40 are, similar to the time of fastening, respectively inserted from the side of the base end portion 41a through the fastening screw insertion holes 23a, 23c of the inverter unit 20 from which the two fastening screws 30 are removed, and the guide pins 40 are inserted into the large-diameter portions 131a, 131c of the screw holes for fastening 13a, 13c at the side of the electric motor 10 which are in communication with the fastening screw insertion holes 23a, 23c (a second releasing process). At this time, the side of the distal end portions 41b of the guide pins 40 inserted into the fastening screw insertion holes 23a, 23c protrude, as shown in FIG. 9C, from the fastening screw insertion holes 23a, 23c.

Here, as shown in FIG. 6, a second mark portion 44b is arranged on the outer circumferential surface of the guide pin 40. The second mark portion 44b is a site which is a warning mark for visibly confirming whether the guide pin 40 is correctly inserted into the fastening screw insertion holes 23a, 23c of the inverter unit 20 which are in communication with the large-diameter portions 131a, 131c. Similar to the first mark portion 44a, the second mark portion 44b is formed by filling paint or the like in the groove formed on the outer circumferential surface of the shaft portion 41, and does not protrude from the outer circumferential surface of the shaft portion 41.

The second mark portion 44b is arranged close to the distal end portion 41b of the guide pin 40. Specifically, the second mark portion 44b is, as shown in FIG. 10A, arranged hidden inside the fastening screw insertion holes 23a, 23c and becomes invisible from the outside in a state that the guide pin 40 is correctly inserted from the side of the base end portion 41a into the fastening screw insertion holes 23a, 23c of the inverter unit 20 which are in communication with the large-diameter portions 131a, 131c of the screw holes for fastening 13a, 13c, and, as shown in FIG. 10B, is arranged outside of the fastening screw insertion holes 23b, 23d and becomes invisible from the outside in a state that the guide pin 40 is incorrectly inserted into the fastening screw insertion holes 23b, 23d which are not in communication with the large-diameter portions 131a, 131c of the screw holes for fastening 13a, 13c. Therefore, in the second releasing process, whether the guide pins 40 are correctly inserted into the fastening screw insertion holes 23a, 23c which are in communication with the large-diameter portions 131a, 131c of the screw holes for fastening 13a, 13c can be easily confirmed according to whether the second mark portions 44b of the guide pins 40 which protrude from the fastening screw insertion holes 23a, 23c of the inverter unit 20 are visible.

Figure 9C:
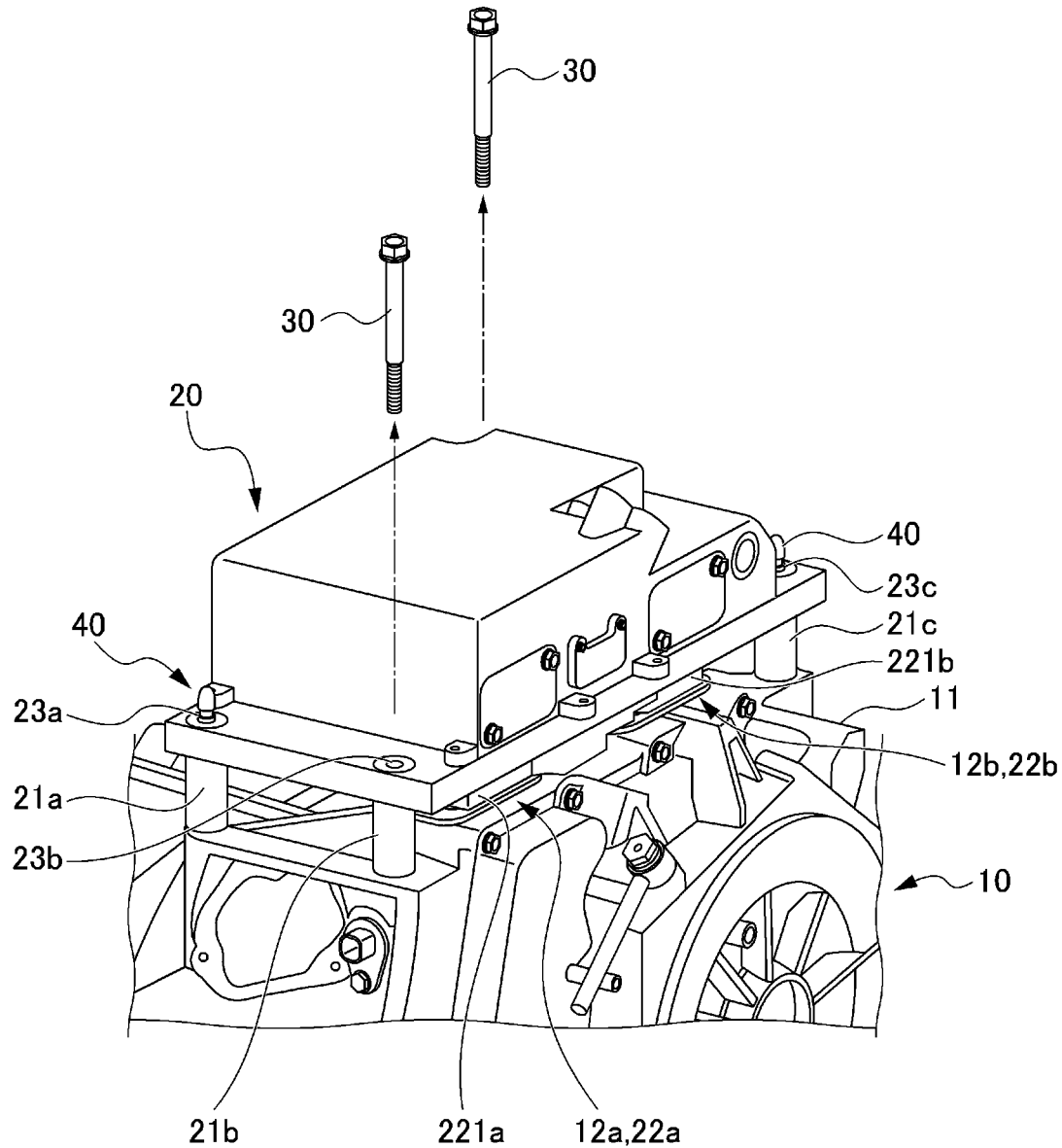
FIG. 9C is a diagram illustrating the releasing method of electric member according to the disclosure.

Next, as shown in FIG. 9C, the rest fastening screws 30 of the four fastening screws 30 are removed (a third releasing process).

Figure 9D:
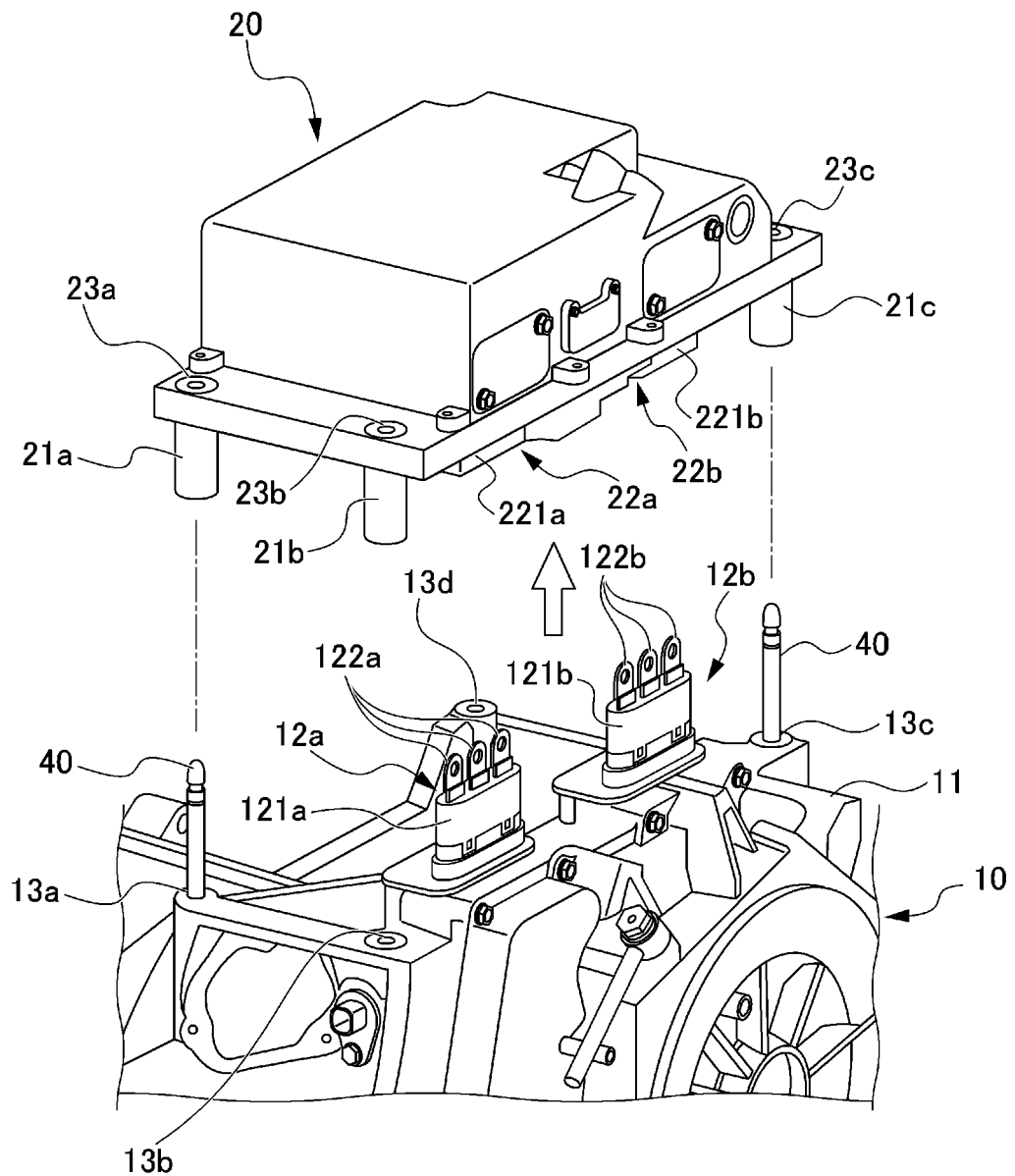
FIG. 9D is a diagram illustrating the releasing method of electric member according to the disclosure.

Thereafter, as shown in FIG. 9D, the inverter unit 20 is moved along the two guide pins 40 toward a direction away from the electric motor 10 (a fourth releasing process).

In the fourth releasing process, the inverter unit 20 is linearly moved along the guide pins 40 in the direction away from the electric motor 10. Because the two guide pins 40 are arranged at the diagonal positions, the inverter unit 20 can be linearly moved in the direction away from the electric motor 10 in a state that lateral movement is regulated. The electrical connection of the three-phase connectors 12a, 12b at the side of the electric motor 10 and the three-phase connectors 22a, 22b at the side of the inverter unit 20 is released during the process in which the inverter unit 20 is moved in the direction away from the electric motor 10.

The situation of the releasing of the electrical connection between the three-phase connector 12b and the three-phase connector 22b is reversed to the case of FIGS. 8A-8D and is performed in an order of FIG. 8D, FIG. 8C, FIG. 8B, and FIG. 8A. That is, if the inverter unit 20 is guided along the guide pins 40 and moved in the direction away from the electric motor 10, at first, the electrical connection between the three-phase connector 12b at the side of the electric motor 10 and the three-phase connector 22b at the side of the inverter unit 20 is released, and at last, the guide pin 40 is pulled out from the fastening screw insertion hole 23c of the inverter unit 20. Therefore, the releasing of the electrical connection between the three-phase connectors 12b, 22b is linearly performed by guiding the movement of the inverter unit 20 along the guide pin 40 in a state that mutual lateral movements of the electric motor 10 and the inverter unit 20 are regulated. Therefore, when the electrical connection between the three-phase connectors 12b, 22b is released, no load is applied to the connection sites between the two.

After the inverter unit 20 is removed from the guide pins 40, the two guide pins 40 protruding from the electric motor 10 are pulled out and removed from the large-diameter portions 131a, 131c (a fifth releasing process). The pull-out operation of the guide pins 40 can be performed easily by the jig not shown using the groove portions 42 of the distal end portions 41b of the guide pins 40. In this way, the releasing of the electric motor 10 and the inverter unit 20 is finished.

According to this releasing method, the fastening can be released while mutual positions of the electric motor 10 and the inverter unit 20 are regulated using the guide pins 40. Moreover, the guide pins 40 do not remain in the electric motor 10 and the inverter unit 20 after releasing. Therefore, the weight increase or the size increase of the load profile of the electric motor 10 and the inverter unit 20 due to the guide pins 40 is not caused.

[Another Embodiment of Guide Pin]

Figure 11:
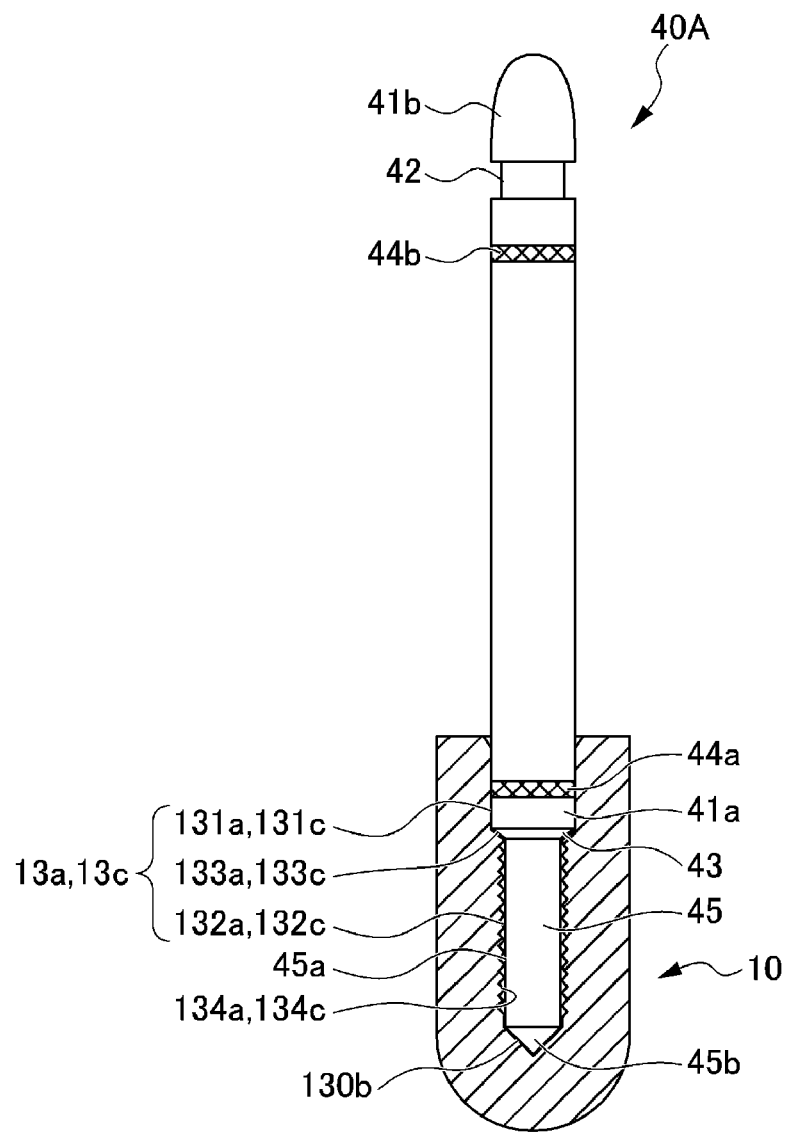
FIG. 11 is a front view showing another example of the guide pin used in the fastening method and the releasing method of electric member according to the disclosure in a state that the guide pin is inserted into a screw hole for fastening.
Figure 12:
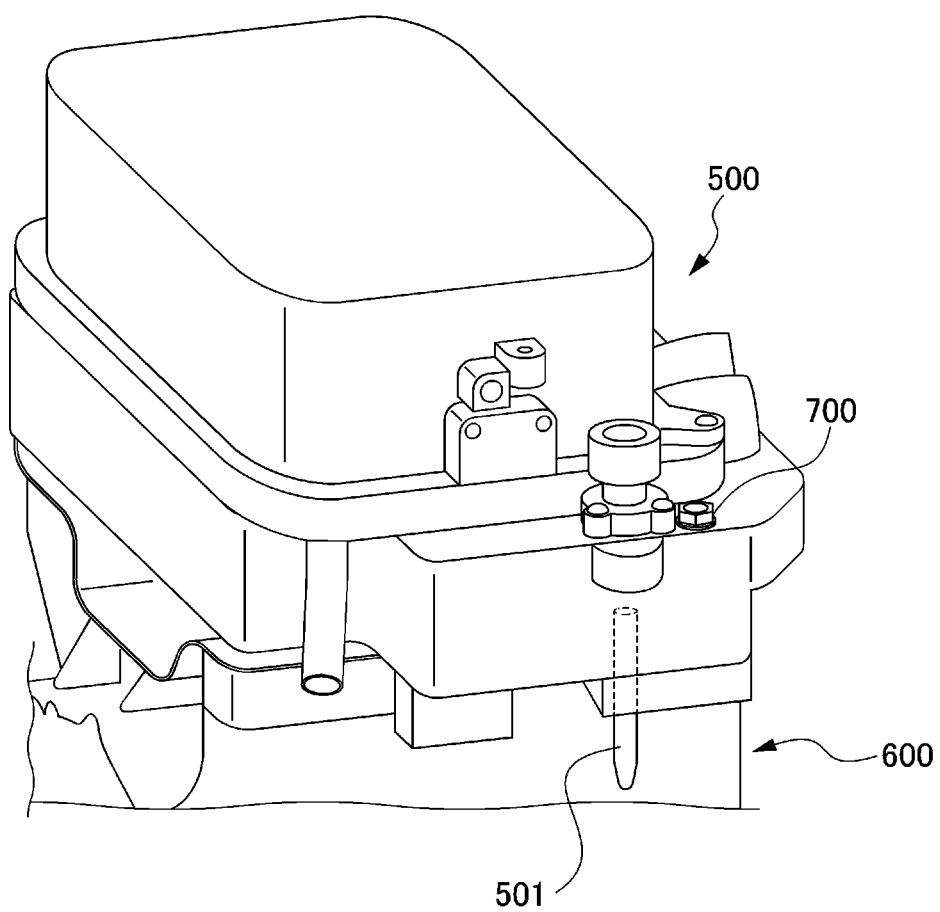
FIG. 12 is a perspective view showing main portions of a conventional fastening structure of electric member.
Figure 13:
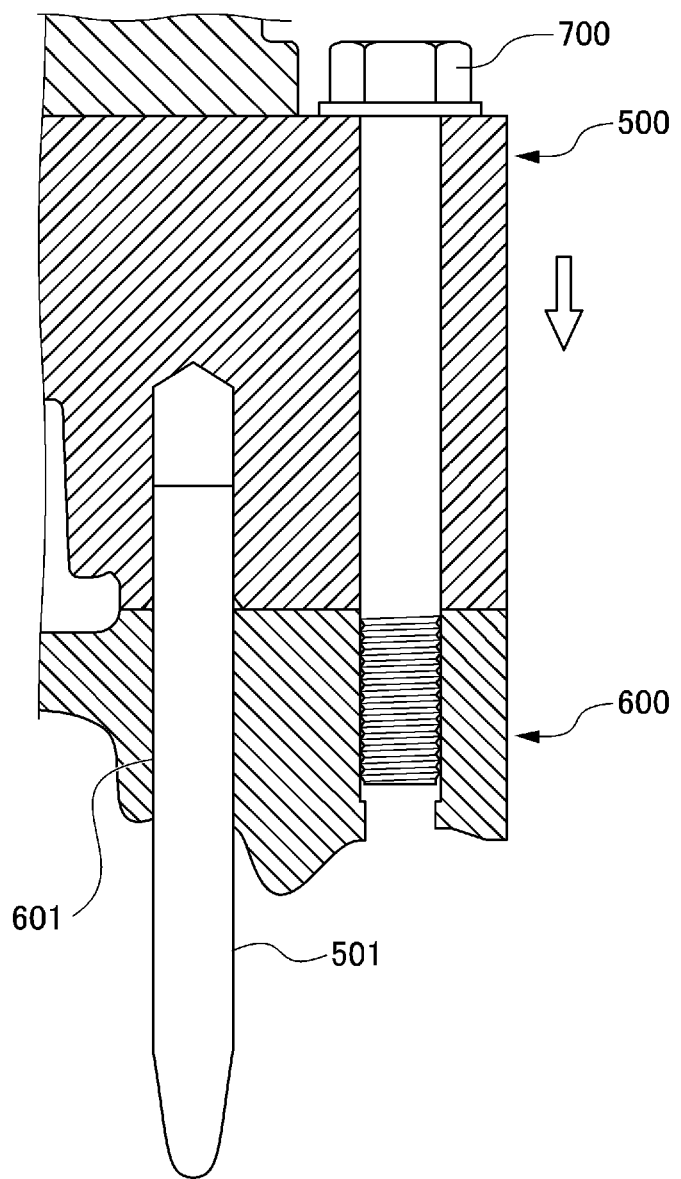
FIG. 13 is a sectional view showing a fastening site in the fastening structure shown in FIG. 12.

FIG. 11 is a front view showing another example of a guide pin used in the fastening method and the releasing method of electric member according to the disclosure. Here, a state in which the guide pin is inserted into the screw hole for fastening is shown. Sites with the same symbols as the guide pin 40 shown in FIG. 6 and FIG. 7A indicate sites having the same configurations, and thus the above description is used for the description of these sites and is omitted in the description below.

A guide pin 40A integrally has an extension shaft portion 45 which extends further downward (toward a screw hole bottom 130b) from the base end portion 41a which is detachably inserted into the large-diameter portions 131a, 131c of the screw holes for fastening 13a, 13c of the electric motor 10.

The extension shaft portion 45 is formed with a diameter smaller than the diameter of the base end portion 41a. Specifically, an outer diameter of the extension shaft portion 45 is smaller than inner diameters of the small-diameter portions 132a, 132c of the screw holes for fastening 13a, 13c (thread diameters of the female screw portions 134a, 134c). Therefore, as shown in FIG. 11, when the base end portion 41a of the guide pin 40A is inserted into the large-diameter portions 131a, 131c of the screw holes for fastening 13a, 13c, the extension shaft portion 45 can be inserted into the small-diameter portions 132a, 132c. At this time, an outer circumferential surface 45a of the extension shaft portion 45 is not in contact with the female screw portions 134a, 134c of the small-diameter portions 132a, 132c.

In addition, a length of the extension shaft portion 45 is substantially the same as axial lengths (depths) of the small-diameter portions 132a, 132c and is configured in manner that when the extension shaft portion 45 is inserted into the small-diameter portions 132a, 132c and the base end portion 41a abuts against the tapered portions 133a, 133c, a distal end 45b of the extension shaft portion 45 also abuts against a screw hole bottom 130b. The screw hole bottom 130b in the embodiment is formed in a mortar shape. The distal end 45b of the extension shaft portion 45 is also formed in a conical shape corresponding to the shape of the screw hole bottom 130b.

The guide pins 40A can be used in place of the guide pins 40. According to the guide pins 40A, the distal ends 45b of the extension shaft portions 45 abut against the screw hole bottom 130b, and thus durability against load applied axially from above the guide pins 40A can be enhanced. Accordingly, buckling of bearing surfaces of the large-diameter portions 131a, 131c (tapered portions 133a, 133c) when the guide pins 40A are inserted can be prevented. In addition, a lateral load on the guide pins 40A can be received by abutting sites of the distal ends 45b of the extension shaft portions 45 and the screw hole bottoms 130b, and an erection state of the guide pins 40A during the fastening and the releasing of the inverter unit 20 can be stabilized. Moreover, the outer circumferential surfaces 45a of the extension shaft portions 45 are not in contact with the female screw portions 134a, 134c of the small-diameter portions 132a, 132c, and thus there is no risk that the extension shaft portions 45 damages the female screw portions 134a, 134c.

In the embodiments described above, examples are described in which the guide pins are used respectively at the fastening sites by the two fastening screws of the four fastening screw, and at least one guide pin may be used. However, from a viewpoint of also being able to regulate movement around a rotation direction of the electric members centred on the guide pins, more than two guide pins are desirably used. In addition, the more the number of the guide pins is, the harder the inserting/removing operation of the guide pins, the alignment operation of the guide pins and the fastening screw insertion holes, and the movement operation along the guide pins are performed, and thus the number of the guide pins to be used is desirably two. The two guide pins are desirably arranged in the diagonal positions as shown in the above embodiments.

Therefore, the disclosure provides a fastening structure of an electric member in which alignment of two electric members using guide pins is possible and weight increase or size increase of load profile of the electric members due to the guide pins is not caused.

In addition, the disclosure provides a fastening method of electric member and a fastening releasing method of electric member in which fastening or fastening releasing of two electric members using the guide pins is possible and weight increase or size increase of the load profile of the electric members due to the guide pins is not caused.

According to the disclosure of the above (1), the guide pins are inserted into the large-diameter portions of the screw holes for fastening in the first electric member to protrude from the first electric member, and thereby the alignment between the electric members using the guide pins is possible. The guide pins are detachably inserted into the large-diameter portions, and thus after the guide pins are removed, no guide pin remains in either of the electric members. Therefore, the weight increase or the size increase of the load profile of the electric members due to the guide pin is not caused.

(2) In the fastening structure of electric member according to (1), inner diameters of the large-diameter portions are equal to or smaller than inner diameters of the fastening screw insertion holes of the second electric member.

According to the disclosure of the above (2), the guide pins can be inserted into the fastening screw insertion holes of the second electric member to be inserted into or removed from the large-diameter portions of the first electric member.

(3) In the fastening structure of electric member according to (1) or (2), the first electric member may be an electric motor, the second electric member may be an inverter unit which has an inverter driving the electric motor, and the electrical connection portions may be three-phase connectors.

According to the disclosure of the above (3), alignment of the electric motor and the inverter unit using the guide pins is possible, and the electric motor and the inverter unit can be electrical connected without application of load to each three-phase connector of the electric motor and the inverter unit.

According to the disclosure of the above (4), the first electric member and the second electric member can be fastened while mutual positions of the first electric member and the second electric member are regulated using the guide pins. Moreover, because the guide pins are removed from the first electric member and the second electric member and do not remain, weight increase or size increase of load profile of the first electric member and the second electric member due to the guide pins is not caused.

(5) In the fastening method of electric member according to (4), the guide pins have a length with which the guide pins penetrate, in a state that the electrical connection portions are connected to each other in the second fastening process, the fastening screw insertion holes of the second electric member to protrude from the fastening screw insertion holes, and the guide pins have, in sites protruding from the fastening screw insertion holes, groove portions (for example, groove portions 42 described later) which enable a pull-out operation using a jig.

According to the disclosure of the above (5), in the fourth fastening process, when the guide pins are pulled out from the fastening screw insertion holes of the second electric member, the pull-out operation can be easily performed using a jig.

(6) In the fastening method of electric member according to (4) or (5), the guide pins may have first mark portions (for example, first mark portions 44a described later) which can be visually confirmed in positions which are not exposed to the outside when the guide pins are inserted into the screw holes for fastening having the large-diameter portions but are exposed to the outside when the guide pins are inserted into the screw holes for fastening not having the large-diameter portions in the first fastening process.

According to the disclosure of the above (6), in the first fastening process, whether the guide pins are correctly inserted into the large-diameter portions of the screw holes for fastening can be easily confirmed according to whether the first mark portion of the guide pins erected in the first electric member is visible.

(7) In the fastening method of electric member according to any one of (4)-(6), the guide pins have extension shaft portions (for example, extension shaft portions 45 described later) inserted into the small-diameter portions of the screw holes for fastening having the large-diameter portions, wherein outer circumferential surfaces (for example, outer circumferential surfaces 45a described later) of the extension shaft portions are not in contact with female screw portions of the small-diameter portions, and distal ends (for example, distal ends 45b described later) of the extension shaft portions may abut against screw hole bottoms (for example, screw hole bottoms 130b described later) of the screw holes for fastening.

According to the disclosure of the above (7), the distal ends of the extension shaft portions of the guide pins abut against the screw hole bottoms, and thus durability against a load applied axially from above the guide pins can be enhanced. Accordingly, buckling of bearing surfaces of the large-diameter portions when the guide pins are inserted can be prevented. In addition, a lateral load on the guide pins can be received by abutting sites of the distal ends of the extension shaft portion and the screw hole bottoms, and thus an erection state of the guide pins at the time of the fastening of the second electric member can be stabilized. Furthermore, the outer circumferential surfaces of the extension shaft portions are not in contact with the female screw portions of the small-diameter portions, and thus there is no risk that the extension shaft portions damage the female screw portions.

According to the disclosure of the above (8), the fastening of the first electric member and the second electric member can be released while mutual positions of the first electric member and the second electric member are regulated using the guide pins. Moreover, because the guide pins do not remain in the first electric member and the second electric member after the releasing, weight increase or size increase of load profile of the first electric member and the second electric member due to the guide pins is not caused.

(9) In the releasing method of electric member according to (8), the guide pins may have a length with which the guide pins penetrate, in a state of being inserted from the fastening screw insertion holes of the second electric member to the large-diameter portions of the first electric member, from the fastening screw insertion holes, and the guide pins have, in sites protruding from the fastening screw insertion hole, groove portions (for example, groove portions 42 described later) which enable a pull-out operation using a jig.

According to the disclosure of the above (9), in the fifth releasing process, when the guide pins are pulled out from the large-diameter portions of the first electric member, the pull-out operation can be easily performed using a jig.

(10) In the releasing method of electric member according to (8) or (9), the guide pins may have second mark portions (for example, second mark portions 44b described later) which can be visually confirmed in positions which are not exposed to the outside when the guide pins are inserted into the fastening screw insertion holes of the second electric member which are in communication with the large-diameter portions of the first electric member but are exposed to the outside when the guide pins are inserted into the fastening screw insertion holes of the second electric member which are not in communication with the large-diameter portions of the first electric member in the second releasing process.

According to the disclosure of the above (10), in the second releasing process, whether the guide pins are correctly inserted into the fastening screw insertion holes which are in communication with the large-diameter portions of the screw holes for fastening can be easily confirmed according to whether the second mark portions of the guide pins protruding from the fastening screw insertion holes of the second electric member are visible.

(11) In the releasing method of electric member according to any one of (8)-(10), the guide pins have extension shaft portions (for example, extension shaft portions 45 described later) inserted into the small-diameter portions of the screw holes for fastening having the large-diameter portions, wherein outer circumferential surfaces (for example, outer circumferential surfaces 45a described later) of the extension shaft portions are not in contact with the female screw portions of the small-diameter portions, and distal ends (for example, distal ends 45b described later) of the extension shaft portions may abut against screw hole bottoms (for example, screw hole bottom 130b described later) of the screw holes for fastening.

According to the disclosure of the above (11), the distal ends of the extension shaft portions of the guide pins abut against the screw hole bottoms, and thus durability against a load applied axially from above the guide pins can be enhanced. Accordingly, buckling of bearing surfaces of the large-diameter portions when the guide pins are inserted can be prevented. In addition, a lateral load on the guide pins can be received by abutting sites of the distal ends of the extension shaft portion and the screw hole bottoms, and thus an erection state of the guide pins at the time of the releasing of the second electric member can be stabilized. Furthermore, the outer circumferential surfaces of the extension shaft portions are not in contact with the female screw portions of the small-diameter portions, and thus there is no risk that the extension shaft portions damage the female screw portions.

According to the disclosure, the fastening structure of electric member can be provided in which the alignment of the two electric members using the guide pins is possible and the weight increase or the size increase of load profile of the electric members due to the guide pins is not caused.

In addition, according to the disclosure, the fastening method of electric member and the releasing method of electric member can be provided in which the fastening or the releasing of the two electric members using the guide pins is possible and the weight increase or the size increase of the load profile of the electric members due to the guide pins is not caused.

What is claimed is:

1. A fastening structure of electric member, wherein a first electric member and a second electric member respectively having electrical connection portions are electrically connected by connection between the electrical connection portions in a state that mutual positions are regulated by guide pins, and fastening screws inserted through fastening screw insertion holes which penetrate the second electric member are respectively screwed into a plurality of screw holes for fastening having female screw portions arranged in the first electric member, and thereby the first electric member and the second electric member are fastened;

at least one of the plurality of screw holes for fastening has large-diameter portions which are arranged on a screw hole entrance side and into which a guide pin is detachably inserted, and small-diameter portions arranged closer to a screw hole bottom than the large-diameter portions and equipped with the female screw portions;

the female screw portions are not arranged in the large-diameter portions, and inner diameters of the large-diameter portions are larger than root diameters of the female screw portions; and outer circumferential surfaces of the fastening screws which are screwed with the female screw portions and inner circumferential surfaces of the large-diameter portions are not in contact with each other.

2. The fastening structure of electric member according to claim 1, wherein inner diameters of the large-diameter portions are equal to or smaller than inner diameters of the fastening screw insertion holes of the second electric member.

3. The fastening structure of electric member according to claim 1, wherein the first electric member is an electric motor;

the second electric member is an inverter unit which has an inverter driving the electric motor; and the electrical connection portions are three-phase connectors.

4. The fastening structure of electric member according to claim 2, wherein the first electric member is an electric motor;

the second electric member is an inverter unit which has an inverter driving the electric motor; and the electrical connection portions are three-phase connectors.

5. A fastening method of an electric member comprising the fastening structure of electric member according to claim 1, comprising:

a first fastening process in which the guide pins are protruded from the first electric member by inserting the guide pins into the large-diameter portions of the screw holes for fastening of the first electric member;

a second fastening process in which the guide pins are inserted into the fastening screw insertion holes of the second electric member, the second electric member is moved along the guide pins in a direction approaching the first electric member, and the electrical connection portions are connected to each other during the movement;

a third fastening process in which the fastening screws are inserted through the fastening screw insertion holes of the second electric member which the guide pins are not inserted through, and thereby the first electric member and the second electric member are fastened;

a fourth fastening process in which the guide pins are pulled out and removed from the fastening screw insertion holes of the second electric member which the guide pins are inserted through; and a fifth fastening process in which the fastening screws are inserted through the fastening screw insertion holes of the second electric member from which the guide pins are removed, and thereby the first electric member and the second electric member are fastened.

6. The fastening method of electric member according to claim 5, wherein the guide pins have a length with which the guide pins penetrate, in a state that the electrical connection portions are connected to each other in the second fastening process, the fastening screw insertion holes of the second electric member to protrude from the fastening screw insertion holes, and the guide pins have, in sites protruding from the fastening screw insertion holes, groove portions which enable a pull-out operation using a jig.

7. The fastening method of electric member according to claim 5, wherein the guide pins have first mark portions which is adapted to be visually confirmed in positions which are not exposed to the outside when the guide pins are inserted into the screw holes for fastening having the large-diameter portions but are exposed to the outside when the guide pins are inserted into the screw holes for fastening not having the large-diameter portions in the first fastening process.

8. The fastening method of electric member according to claim 6, wherein the guide pins have first mark portions which is adapted to be visually confirmed in positions which are not exposed to the outside when the guide pins are inserted into the screw holes for fastening having the large-diameter portions but are exposed to the outside when the guide pins are inserted into the screw holes for fastening not having the large-diameter portions in the first fastening process.

9. The fastening method of electric member according to claim 5, wherein the guide pins have extension shaft portions inserted into the small-diameter portions of the screw holes for fastening having the large-diameter portions, wherein outer circumferential surfaces of the extension shaft portions are not in contact with the female screw portions of the small-diameter portions, and distal ends of the extension shaft portions abut against screw hole bottoms of the screw holes for fastening.

10. The fastening method of electric member according to claim 6, wherein the guide pins have extension shaft portions inserted into the small-diameter portions of the screw holes for fastening having the large-diameter portions, wherein outer circumferential surfaces of the extension shaft portions are not in contact with the female screw portions of the small-diameter portions, and distal ends of the extension shaft portions abut against screw hole bottoms of the screw holes for fastening.

11. The fastening method of electric member according to claim 7, wherein the guide pins have extension shaft portions inserted into the small-diameter portions of the screw holes for fastening having the large-diameter portions, wherein outer circumferential surfaces of the extension shaft portions are not in contact with the female screw portions of the small-diameter portions, and distal ends of the extension shaft portions abut against screw hole bottoms of the screw holes for fastening.

12. A releasing method of an electric member comprising the fastening structure of electric member according to claim 1, the releasing method comprising:

a first releasing process in which among the fastening screws for fastening the first electric member and the second electric member, the fastening screws screwed with the screw holes for fastening having the large-diameter portions of the first electric member are removed;

a second releasing process in which the guide pins are inserted through the fastening screw insertion holes of the second electric member from which the fastening screws are removed, and the guide pins are inserted into the large-diameter portions of the first electric member;

a third releasing process in which a rest fastening screws among the plurality of fastening screws for fastening the first electric member and the second electric member are removed;

a fourth releasing process in which the second electric member is moved along the guide pins in a direction away from the first electric member, and connection between the electrical connection portions is released during the movement; and a fifth releasing process in which the guide pins protruding from the first electric member are pulled out and removed from the large-diameter portions.

13. The releasing method of electric member according to claim 12, wherein the guide pins have a length with which the guide pins penetrate, in a state of being inserted from the fastening screw insertion holes of the second electric member to the large-diameter portions of the first electric member, from the fastening screw insertion holes, and the guide pins have, in sites protruding from the fastening screw insertion hole, groove portions which enable a pull-out operation using a jig.

14. The releasing method of electric member according to claim 12, wherein the guide pins have second mark portions which is adapted to be visually confirmed in positions which are not exposed to the outside when the guide pins are inserted into the fastening screw insertion holes of the second electric member which are in communication with the large-diameter portions of the first electric member but are exposed to the outside when the guide pins are inserted into the fastening screw insertion holes of the second electric member which are not in communication with the large-diameter portions of the first electric member in the second releasing process.

15. The releasing method of electric member according to claim 13, wherein the guide pins have second mark portions which is adapted to be visually confirmed in positions which are not exposed to the outside when the guide pins are inserted into the fastening screw insertion holes of the second electric member which are in communication with the large-diameter portions of the first electric member but are exposed to the outside when the guide pins are inserted into the fastening screw insertion holes of the second electric member which are not in communication with the large-diameter portions of the first electric member in the second releasing process.

16. The releasing method of electric member according to claim 12, wherein the guide pins have extension shaft portions inserted into the small-diameter portions of the screw holes for fastening having the large-diameter portions, wherein outer circumferential surfaces of the extension shaft portions are not in contact with the female screw portions of the small-diameter portions, and distal ends of the extension shaft portions abut against screw hole bottoms of the screw holes for fastening.

17. The releasing method of electric member according to claim 13, wherein the guide pins have extension shaft portions inserted into the small-diameter portions of the screw holes for fastening having the large-diameter portions, wherein outer circumferential surfaces of the extension shaft portions are not in contact with the female screw portions of the small-diameter portions, and distal ends of the extension shaft portions abut against screw hole bottoms of the screw holes for fastening.

18. The releasing method of electric member according to claim 14, wherein the guide pins have extension shaft portions inserted into the small-diameter portions of the screw holes for fastening having the large-diameter portions, wherein outer circumferential surfaces of the extension shaft portions are not in contact with the female screw portions of the small-diameter portions, and distal ends of the extension shaft portions abut against screw hole bottoms of the screw holes for fastening.

* * * * *